(12) United States Patent
Koizumi et al.

(10) Patent No.: US 7,129,985 B1
(45) Date of Patent: Oct. 31, 2006

(54) IMAGE SENSING APPARATUS ARRANGED ON A SINGLE SUBSTRATE

(75) Inventors: Toru Koizumi, Yokohama (JP); Shigetoshi Sugawa, Atsugi (JP); Isamu Ueno, Hadano (JP); Katsuhisa Ogawa, Machida (JP); Tetsunobu Kochi, Hiratsuka (JP); Katsuhito Sakurai, Machida (JP); Toshiaki Endo, Atsugi (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/444,675

(22) Filed: Nov. 22, 1999

(30) Foreign Application Priority Data

| Nov. 24, 1998 | (JP) | .................... 10-333126 |
| Dec. 28, 1998 | (JP) | .................... 10-374422 |
| Dec. 28, 1998 | (JP) | .................... 10-374604 |

(51) Int. Cl.
*H04N 5/225* (2006.01)
*H04N 5/335* (2006.01)

(52) U.S. Cl. ............... 348/372; 348/207.99; 348/308

(58) Field of Classification Search .............. 348/231.1
See application file for complete search history.

(56) References Cited

U.S. PATENT DOCUMENTS

| 4,835,404 A | 5/1989 | Sugawa et al. ............. 250/578 |
| 4,879,470 A | 11/1989 | Sugawa et al. ............. 250/578 |
| 4,967,067 A | 10/1990 | Hashimoto et al. ....... 250/208.1 |
| 4,972,243 A | 11/1990 | Sugawa et al. ................ 357/30 |
| 5,162,912 A | 11/1992 | Ueno et al. ............. 358/213.16 |
| 5,184,006 A | 2/1993 | Ueno ....................... 250/208.1 |
| RE34,309 E | 7/1993 | Tanaka et al. .......... 358/213.31 |
| 5,233,442 A | 8/1993 | Kawai et al. ................ 358/482 |
| 5,262,870 A | 11/1993 | Nakamura et al. .......... 358/212 |
| 5,272,548 A | 12/1993 | Kawai et al. ................ 358/482 |
| 5,317,406 A | 5/1994 | Kobayashi et al. .......... 348/307 |
| 5,335,094 A | 8/1994 | Kaifu et al. ................. 358/494 |
| 5,539,196 A | 7/1996 | Miyawaki et al. ........ 250/208.1 |
| 5,693,932 A | 12/1997 | Ueno et al. .............. 250/208.1 |
| 5,714,752 A | 2/1998 | Ueno et al. .............. 250/208.1 |
| 5,875,034 A * | 2/1999 | Shintani et al. ............. 358/296 |
| 5,914,485 A | 6/1999 | Kobayashi et al. ....... 250/208.1 |
| 6,002,287 A | 12/1999 | Ueno et al. ................. 327/307 |
| 6,025,875 A * | 2/2000 | Vu et al. ..................... 348/241 |

(Continued)

FOREIGN PATENT DOCUMENTS

EP  0 254 497 A2 *  1/1988

(Continued)

OTHER PUBLICATIONS

"Camera on a Chip" Ackland, B.', Dickinson, A.', Solid-state Circuits Conference, 1996. Digest of Technical Papers. 43rd ISSCC., 1996 IEEE International Feb. 8-10, 1996 Pane(s): 22-25. 412.*

*Primary Examiner*—Thai Tran
*Assistant Examiner*—Heather R. Jones
(74) *Attorney, Agent, or Firm*—Fitzpatrick, Cella, Harper & Scinto

(57) ABSTRACT

A sensor integrated on a single semiconductor substrate comprises a sensor block including a pixel unit including a plurality of pixels each including a light-receiving element and scanning units for selecting a pixel of the pixel unit, and a signal processing block for processing a signal output from the sensor block. To reduce noise and power consumption, the power supply voltage or the amplitude or high level of a clock signal used in the sensor block is higher than the power supply voltage of the signal processing block.

8 Claims, 19 Drawing Sheets

U.S. PATENT DOCUMENTS

| | | | |
|---|---|---|---|
| 6,121,087 A * | 9/2000 | Mann et al. | 438/258 |
| 6,184,516 B1 * | 2/2001 | Sawada et al. | 250/214.1 |
| 2002/0022325 A1 * | 2/2002 | Gardner et al. | 438/287 |

FOREIGN PATENT DOCUMENTS

| | | |
|---|---|---|
| JP | 2566402 B2 | 9/1988 |
| JP | 5-54955 | 3/1993 |
| JP | 5-252417 | 9/1993 |
| JP | 5-252477 | 9/1993 |
| JP | 5-333976 | 12/1993 |
| JP | 8-179847 | 7/1996 |
| JP | 9-55890 | 2/1997 |
| JP | 9-236843 | 9/1997 |
| JP | 10-124169 | 5/1998 |

* cited by examiner

FIG. 20
| OPERATION MODE | AE/AF SYSTEM | POWER SUPPLY SENSOR SYSTEM | DATA PROCESSING SYSTEM | OUTPUT SYSTEM |
|---|---|---|---|---|
| AT AE/AF CALCULATION | ON | ON | OFF | OFF |
| AT IMAGE SENSING | OFF | ON | ON | OFF |
| AT DATA OUTPUT | OFF | OFF | OFF (ON) | ON |
FIG. 21A
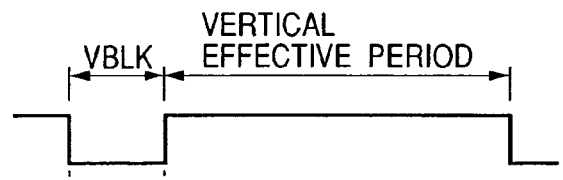
FIG. 21B  MEMORY OPERATION CLOCK
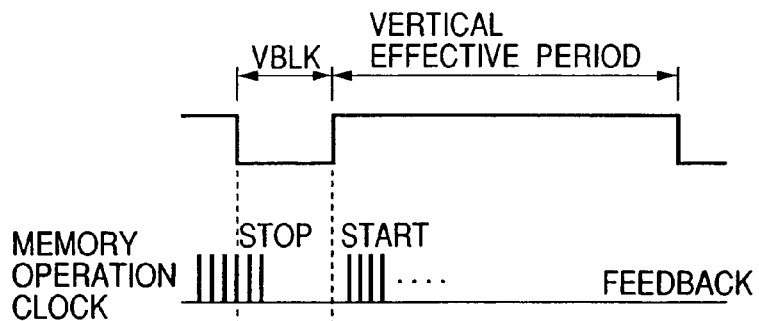
FIG. 21C  POWER SOURCE OFF
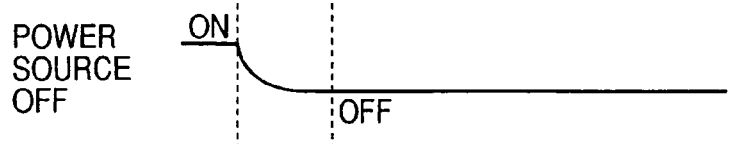
FIG. 21D  POWER SOURCE ON
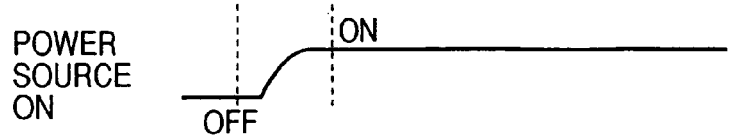

FIG. 24A
100% OPERATION
FIG. 24B
50% OPERATION
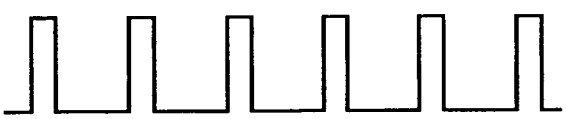
CLOCK THINNING-OUT
FIG. 24C
25% OPERATION
FIG. 24D
50%
CHANGE OF DUTY RATIO OF CLOCK
FIG. 26
| OPERATION MODE | AE/AF SYSTEM | SENSOR SYSTEM | DATA PROCESSING SYSTEM | OUTPUT SYSTEM |
|---|---|---|---|---|
| AT AE/AF CALCULATION | 100% | 50% | 25% | 25% |
| AT IMAGE SENSING | 25% | 100% | 100% | 25% |
| AT DATA OUTPUT | 25% | 25% | 50% | 100% |

IMAGE SENSING APPARATUS ARRANGED ON A SINGLE SUBSTRATE

BACKGROUND OF THE INVENTION

1. Field of the Invention

The present invention relates to an image sensing apparatus having a sensor block with a photoelectric conversion function and a signal processing block for processing a signal from a pixel unit.

2. Related Background Art

Some sensors have a sensor block and signal processing block integrated on a single semiconductor substrate. The sensor block has a pixel unit comprising a plurality of pixels each having a light-receiving element such as a photodiode and a scanning unit for selecting a pixel of the pixel unit, and the signal processing block has an amplifier and the like for processing a signal output from the sensor block. A sensor whose pixel unit is formed by a CMOS process is called a CMOS sensor.

In recent years, a demand for image sensing apparatuses having wide dynamic ranges, high S/N ratios, and low power consumption has arisen for application to digital cameras.

In a conventional sensor that has a sensor block having a pixel unit and scanning unit for selecting a pixel, and a signal processing block for processing a signal output from the sensor block, a single power source is used. If the signal processing block takes priority, the power supply voltage of the sensor block must be reduced to assure operation of this block. As a result, the dynamic range is sacrificed.

A buried photodiode used for, e.g., a CCD can obtain a signal with a high S/N ratio. However, the photodiode generally uses a high power supply voltage, and this results in an increase in clock noise of the signal processing block. As the power supply voltage becomes high, the electric field applied to each MOS transistor (insulated gate transistor) of the signal processing block becomes high. For this reason, impact ionization readily occurs, and noise charges due to this phenomenon reach the sensor block. Especially a pixel unit using a buried photodiode easily generates this noise because of the high power supply voltage.

When a power supply voltage equal to that of the sensor block is used for the signal processing block, the power consumption increases because of the high power supply voltage of the latter block.

A conventional image sensing apparatus has functional processing blocks including a sensor processing system for receiving light from an object and photoelectrically converting the light, a data processing system for sampling/holding an electrical signal from the sensor processing system, to perform shading processing, and for A/D-converting the signal to perform clamp processing or gamma processing, an AE/AF processing system for setting the automatic exposure time and automatic focusing/distance measurement before image sensing, and an output processing system for outputting an appropriate image signal to an output apparatus such as a display, printer, or recording medium.

Some image sensing apparatuses also have a release function for iris selection or a display processing system such as a liquid crystal display.

For a solid-state image sensing apparatus having these processing systems, to reduce consumption of the power source as a limited resource is a longtime challenge. This demand is particularly strong for an apparatus using a battery as a power source. However, a conventional image sensing apparatus has only one power switch, and power consumption is turned on/off at once whenever the user turns on/off the power switch at appropriate times.

A prior art of this image sensing apparatus will be described with reference to FIG. 1. Referring to FIG. 1, when the image sensing start button of an operation unit 60 is depressed, a system control unit 58 detects an image sensing start signal and supplies a trigger signal and clock signal to activate a sensor drive circuit 43 and also causes an image sensor 42 to detect an image sensing signal and output it. This image sensing signal is supplied to an AE/AF processing unit 56 to set an appropriate exposure amount and adjust the focal length to set the lens at the in-focus position. The image sensing signal obtained by the image sensor 42 is converted into a digital signal by an A/D conversion unit 46 in accordance with an instruction from the system control unit 58. A DSP 47 processes the digital signal by shading processing or gamma processing using a memory 48. An encoder 51 is triggered by the system control unit 58 to convert the signal into an image signal compatible with an output apparatus such as a communication system, recording system, or still image printing system, and output the image signal to a corresponding output apparatus 61. The circuits of this image sensing apparatus are designed such that the system control unit 58 repeats a predetermined operation in accordance with the operation of the operation unit 60, and each block starts operation in accordance with an instruction from the system control unit 58. To achieve lower power consumption, the blocks themselves must be designed to have low power consumption.

Japanese Patent No. 2566402 aiming at reduction of power consumption of an image sensing apparatus discloses an information processing apparatus which is provided in a camera to receive and output information for setting image sensing conditions during a clock signal supply period. This information processing apparatus has a main switch manually set at the first position when the camera executes the main operation associated with image sensing or at the second position otherwise, a time count means for measuring a first time when the main switch is at the first position and measuring a second time longer than the first time when the main switch is at the second position, and a gate means for inhibiting supply of the clock signal to the information processing apparatus until the first or second time is counted by the time count means.

On the basis of the state of the information processing apparatus, the time in which supply of the clock signal for information processing is inhibited can be automatically changed in accordance with the state of the main switch. Additionally, the number of times information processing is executed can be decreased in accordance with the purpose intended. Hence, the power consumption can be reduced.

In association with an information processing apparatus such as a personal computer, Japanese Laid-Open Patent Application No. 5-333976 discloses an information processing apparatus having a CPU operated by a clock signal supplied at a frequency that changes depending on the state, a ROM, and a RAM. This information processing apparatus has a means for changing some or all voltages supplied to the CPU, ROM, and RAM in correspondence with the frequency of the clock signal supplied to the CPU. With this arrangement, the operation speed of the CPU can be controlled in accordance with a software instruction. In addition, the supply voltages to the various devices can be controlled. Hence, the power consumption of the information processing apparatus can be reduced.

In a conventional image sensing apparatus, however, even processing systems that are not in use are always turned on or off, resulting in wasteful power consumption.

Furthermore, turning on/off the power source readily generates noise. This may adversely affect display or recording of an image signal.

A general image sensing apparatus is repeatedly powered on/off. This may result in an operation clock shift between processing systems, so undesired image sensing data may be generated because of a synchrony.

The image sensing apparatus has an image sensor unit for sensing an object image, image sensing signal processing unit, AE/AF processing system for computing to achieve the automatic exposure setting function (AE)/automatic focus setting function (AF), and output processing unit. Along with a recent progress in semiconductor technology, normally, a clock signal is supplied to various units to synchronize the operation of each unit and remove time loss.

When supply of the clock signal is stopped, the operations of the units stop. Only the floating current flows to each unit, and the total current is reduced. The power consumption can be reduced by stopping supply of the clock signal. As one prior art, Laid-Open Patent Application No. 9-55890 discloses a "solid-state image sensing apparatus" which stops the driving clock group of a sensor scanning circuit during a period other than the effective image signal period to reduce the power consumption.

Alternatively, it is well known that the clock frequency may be changed to reduce the power consumption of the processing circuit. The power consumption increases in proportion to the clock frequency. As another prior art, Japanese Patent Application Laid-open No. 9-236843 discloses a "solid-state image sensing apparatus" which decreases the number of electron shutter pulses boosted in accordance with the light amount to reduce the power consumption.

Japanese Patent Application Laid-open No. 5-54955 discloses an apparatus which independently selectively supplies a predetermined clock to each functional block. Japanese Patent Application Laid-open No. 5-252417 discloses an apparatus which switches the clock frequency between the blanking period and the effective image period in accordance with a blanking signal. Japanese Patent Application Laid-open No. 5-252477 discloses an apparatus which selects one of two kinds of clocks in accordance with the operation mode of a VTR to selectively operate circuits. Japanese Patent Application Laid-open No. 5-333976 discloses an apparatus capable of changing some or all of the clock frequency to the CPU and supply voltages to various devices. Japanese Patent Application Laid-open No. 8-179847 discloses an apparatus for selectively supplying a plurality of clocks with different frequencies on the basis of the information of each functional block. Japanese Patent Application Laid-open No. 10-124169 discloses an apparatus which controls the frequency of the operation clock of the I/O controller or stops the clock in synchronism with the CPU.

Also, the entire system may be set in accordance with the operation frequency of a processing circuit that has the lowest processing load. More specifically, an apparatus having a plurality of processing circuits independently designed is operated in accordance with the lowest one of the clock frequencies of the processing circuits, thereby reducing the power consumption.

An appropriate frequency of a clock signal is set taking balance between reduction of power consumption and operation of the apparatus. However, even when clock frequencies are independently controlled, processing systems that do not function in a given operation mode also always operate at the maximum frequency, and the entire system consumes wasteful power. Even when the clock frequency of the sensor is made low for clock thinning-out, the data processing system including an A/D converter and DSP (Digital Signal Processor: processor dedicated to digital signal processing) as peripheral devices continues its high-speed operation, resulting in wasteful power consumption.

Even if the operation frequency of the entire system is set low, the clock frequency is limited to the low frequency even in processing which does not use the corresponding circuit. For this reason, the operation performance of the entire system degrades.

SUMMARY OF THE INVENTION

It is an object of the present invention to provide a sensor and image sensing apparatus which can reduce the power consumption.

In order to achieve the above object, according to an aspect of the present invention, there is provided a sensor integrated on a single semiconductor substrate, comprising a sensor block including a pixel unit comprising a plurality of pixels each having a light-receiving element, and a scanning unit for selecting a pixel of the pixel unit, a signal processing block for processing a signal output from the sensor block, and means for setting a power supply voltage or an amplitude or high level of a clock signal used in the sensor block to be higher than a power supply voltage of the signal processing block.

According to another aspect of the present invention, there is provided an image sensing apparatus comprising a sensor processing system including an image sensor and a driving circuit for the image sensor, a data processing system having an A/D conversion unit and a DSP (Digital Signal Processor), an AE/AF processing system for calculating and processing to attain an automatic exposure function (AE) and an automatic focusing function (AF), an output processing system for encoding data in accordance with an output apparatus, and a system control unit for controlling a power source or an operation clock of each processing system, wherein the system control unit includes means for independently turning on or off at least one of the power source and the operation clock of each processing system, and at least one of the power source and the operation clock of at least one processing system is turned off on the basis of a control signal from the system control unit.

According to still another aspect of the present invention, there is provided an image sensing apparatus comprising a sensor system including an image sensor and a driving circuit for the image sensor, a data processing system including an A/D conversion unit and a DSP, an AE/AF processing system for calculating to attain an automatic exposure function (AE) and an automatic focusing function (AF), an output processing system for encoding data in accordance with an output apparatus, a system control unit for designating an input clock frequency of each of the processing systems, and clock control means for changing the clock frequency of each processing system on the basis of a control signal from the system control unit.

Other objects, features, and advantages of the present invention will be apparent from the following detailed description in conjunction with the accompanying drawings.

BRIEF DESCRIPTION OF THE DRAWINGS

FIG. 20 is a table showing the states of operation modes of the 10th embodiment;
FIGS. 21A, 21B, 21C and 21D are timing charts showing the operation of the 10th embodiment;
FIGS. 24A, 24B, 24C and 24D are waveform charts showing the states of operation modes of the 11th embodiment;
FIG. 26 is a table showing the operation of the 11th Embodiment.

DESCRIPTION OF THE PREFERRED EMBODIMENTS

The embodiments of the present invention will be described below in detail with reference to the accompanying drawings.

Figure 2:
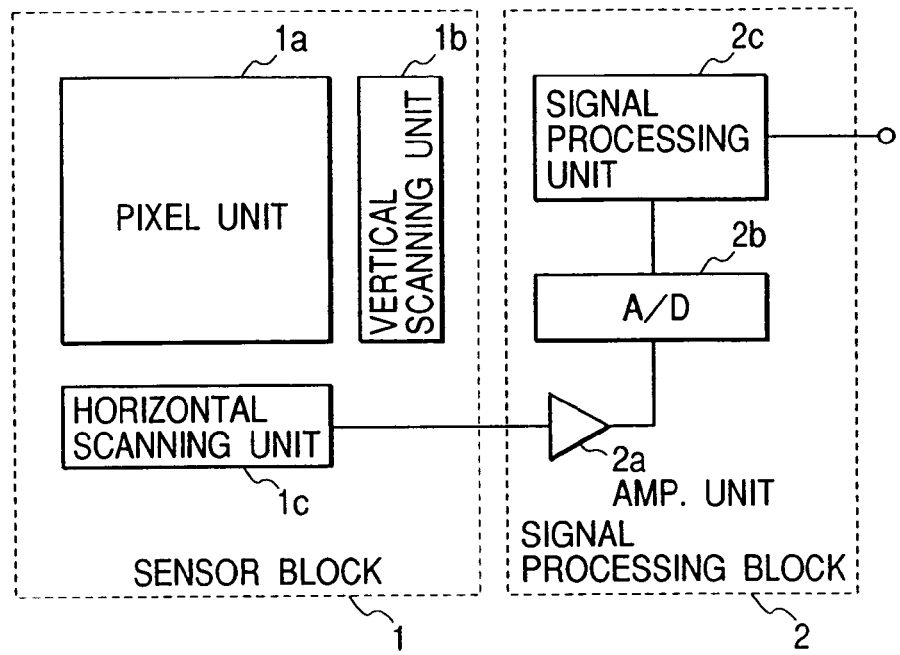
FIG. 2 is a block diagram showing a sensor.

FIG. 2 is a block diagram showing the schematic arrangement of a sensor integrated on a single semiconductor substrate. As shown in FIG. 2, the sensor has a sensor block 1 and signal processing block 2. The sensor block 1 comprises a pixel unit 1a, vertical scanning unit 1b for vertically scanning the pixel unit 1a, and horizontal scanning unit 1c for horizontally scanning the pixel unit 1a. The signal processing block 2 comprises an amplifier unit 2a including an automatic gain controller, A/D (Analog/Digital) conversion circuit 2b, and signal processing unit 2c for processing a signal from the A/D conversion circuit 2b.

Figure 3:
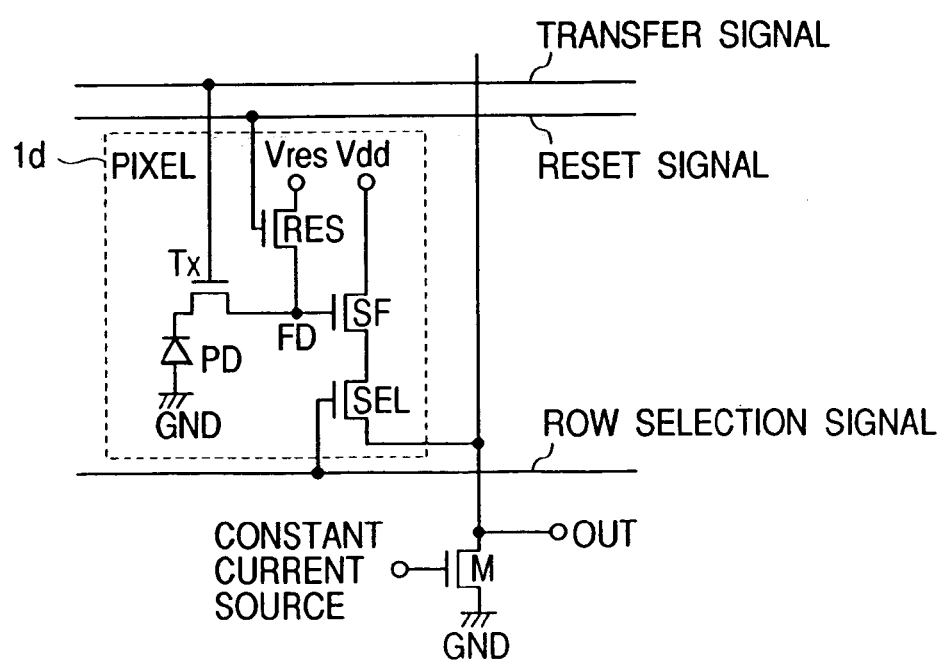
FIG. 3 is a view showing a structure of a pixel.
Figure 8:
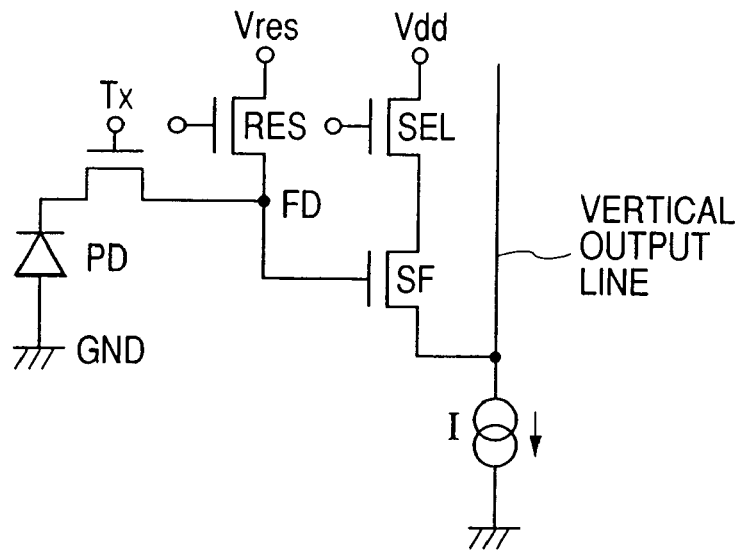
FIG. 8 is a view showing another structure of a pixel.

FIG. 3 is a schematic view showing a structure of one pixel 1d in the pixel unit. FIG. 8 is a schematic view showing another structure of a pixel in the pixel unit. Referring to FIG. 3, the pixel has a buried photodiode PD, transfer MOS transistor TX for transferring signal charges from the buried photodiode PD, floating diffusion region FD (charge/voltage conversion unit) where the transferred signal charges are held, amplification MOS transistor SF with a gate connected to the floating diffusion region FD, selection MOS transistor SEL, and reset MOS transistor RES for resetting the floating diffusion region FD and amplification MOS transistor SF. The selection MOS transistor SEL builds a source follower circuit together with an MOS transistor M having a constant current source. Referring to FIG. 8, the selection MOS transistor SEL and amplification MOS transistor SF are replaced with each other.

When a buried photodiode is used as a light-receiving element of the pixel unit, the floating diffusion region FD in the pixel must be set at the depletion voltage or more to deplete the buried photodiode and transfer stored charges to the floating diffusion region FD. As a result, the power supply voltage must be 5V or more.

In the first embodiment of the present invention, the power supply voltage of the sensor block 1 is 5 V, and the power supply voltage of the signal processing block 2 is 4 V.

The buried photodiode will be described below with reference to FIG. 4.

Figure 4:
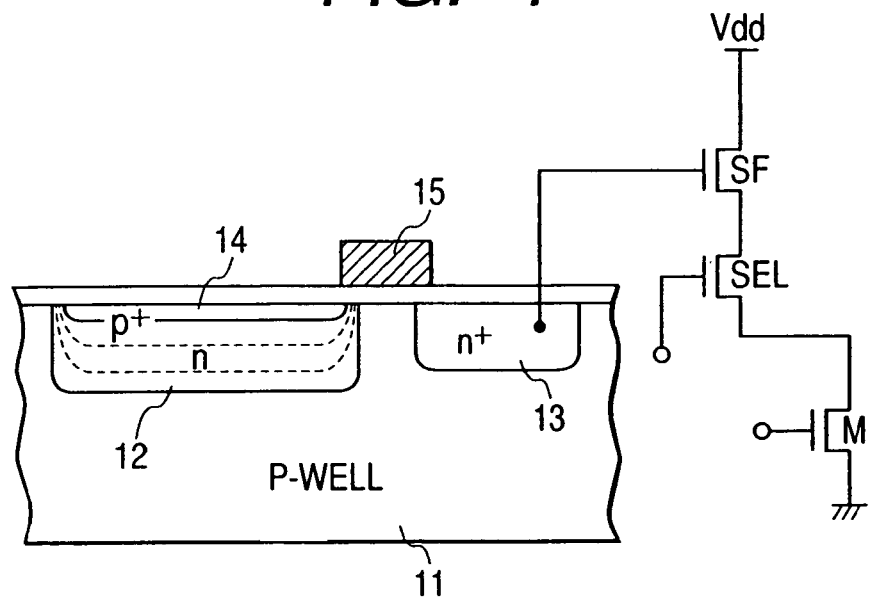
FIG. 4 is a view showing the pixel.

As shown in FIG. 4, the buried photodiode has an n-type region 12 in a p-well 11, and a $p^+$-type region 14 formed in the substrate surface of the n-type region 12.

Charges stored in the n-type region 12 can be transferred to a floating diffusion region ($n^+$-type region) 13 when a voltage is applied to a gate electrode 15. In the buried photodiode, when the junction between the $p^+$-type region 14 and n-type region 12 and the junction between the p-well 11 and n-type region 12 are reverse-biased, a depletion layer (dotted line) spreads from the junction between the $p^+$-type region 14 and n-type region 12. Another depletion layer (dotted line) spreads from the junction between the p-well 11 and n-type region 12. The two deletion layers running from the upper and lower side come into contact with each other. When the voltage (VFD) of the floating diffusion region 13 is set to be higher than the depletion voltage (Vdep) at that time (VFD>Vdep), all charges stored in the n-type region 12 can be transferred to the floating diffusion region ($n^+$-type region) 13.

Figure 5:
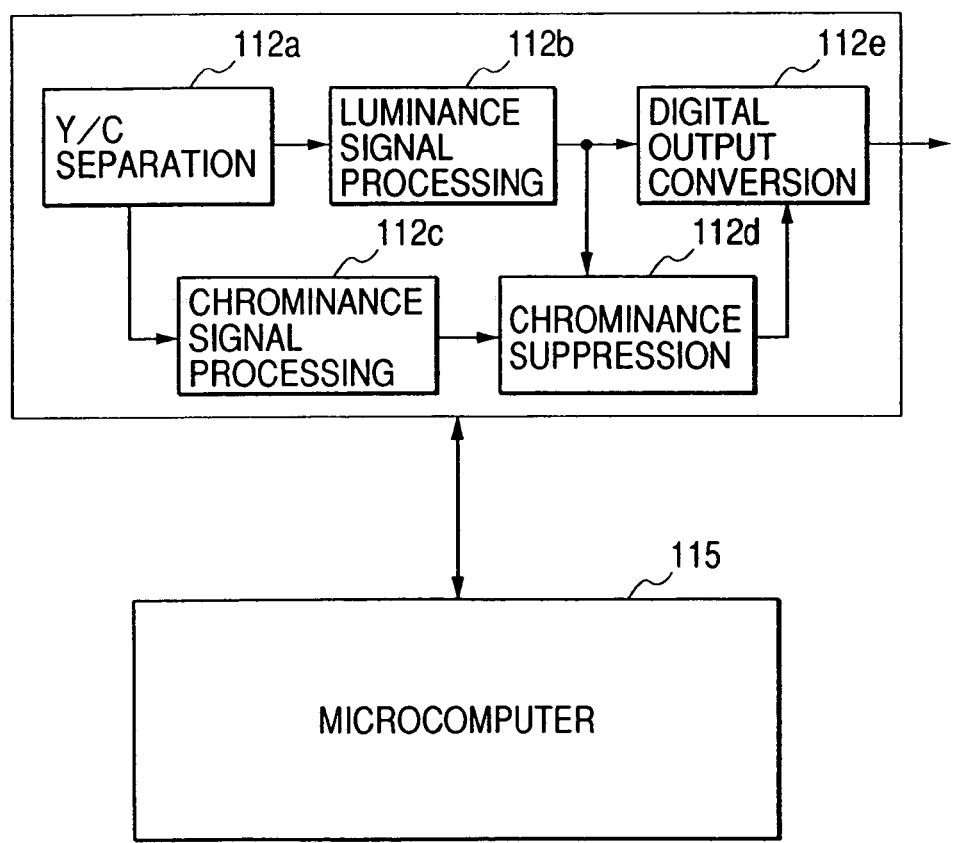
FIG. 5 is a block diagram showing a signal processing unit.

As shown in FIG. 5, the signal processing unit 2c has a Y/C separation circuit 112a, luminance signal processing circuit 112b, chrominance signal processing circuit 112c, chrominance suppression circuit 112d, digital output conversion circuit 112e, and microcomputer 115.

The microcomputer controls the Y/C separation circuit 112a and the like. The microcomputer also receives a luminance signal and chrominance signal, and adjusts focusing and controls exposure on the basis of the received signals.

When the power supply voltage of the sensor block is set at 5 V, and the power supply voltage of the signal processing block is reduced from 5 V to 4 V, clock noise becomes ⅘ in proportion to the amplitude. The power consumption of a digital circuit is expressed by $½·f·C·V^2$. When the power supply voltage becomes ⅘, the power consumption is reduced to 64%. On the other hand, the power consumption of an analog circuit is expressed by I·V. The through current I does not change unless the type of analog circuit is changed. Hence, the power consumption decreases to ⅘ in correspondence with the decrease in power supply voltage.

In an image sensing apparatus which outputs only a sensor output, the power consumption of logic circuits is very low, and most circuits are analog circuits. For this reason, the power consumption is as low as about 80%. In an image sensing apparatus having a large-scale digital signal processing system, the ratio of the power consumption of digital circuits is high, so the power consumption decreases further.

The image sensing apparatus of the first embodiment, which has a pixel formed from a buried photodiode as shown in FIG. 4, can improve the S/N ratio and reduce the power consumption as compared to the prior art. The structure of a pixel is not limited to this, and another pixel structure having a function of converting an optical signal into charges and outputting them may be employed.

A specific circuit arrangement in which the power supply voltage of the sensor block is different from that of the signal processing block will be described next with reference to FIG. 6.

Figure 6:
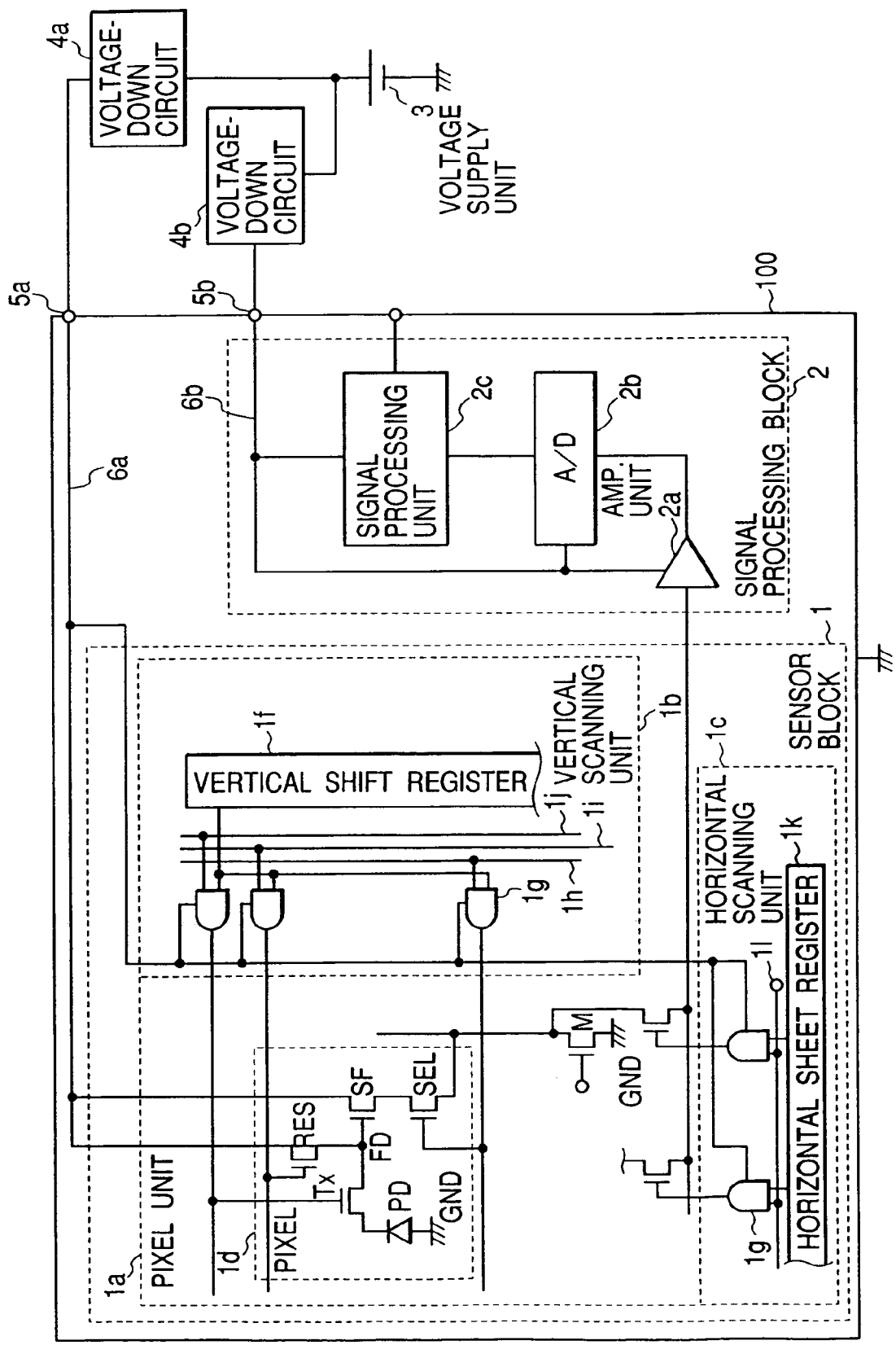
FIG. 6 is a block diagram showing the first embodiment.

The same reference numerals as in FIGS. 2 and 3 denote the same parts in FIG. 6. In a sensor 100, the sensor block 1 and signal processing block are integrated on a single semiconductor substrate. Voltage supply terminals 5a and 5b are prepared to apply power supply voltages having different voltage values to the sensor block and signal processing block. The vertical scanning unit 1b includes a vertical shift register 1f, AND circuit, and pulse supply lines 1h to 1j. An AND circuit 1g outputs a pulse for turning on a transistor upon receiving a pulse from the vertical shift register and pulse supply lines. The horizontal scanning unit 1c has a horizontal shift register 1k, AND circuit 1g, and pulse supply line 1l. The AND circuit 1g outputs a pulse for turning on a transistor upon receiving a pulse from the horizontal shift register and pulse supply line.

The voltages from a voltage supply unit 3 are set at 5 V and 4 V by voltage-down circuits 4a and 4b, respectively. The voltage applied to the voltage supply terminal 5a is transmitted through a voltage supply line 6a. The voltage applied to the voltage supply terminal 5b is transmitted through a voltage supply line 6b.

In this embodiment, the voltage of the voltage supply line 6a is supplied as a power supply voltage from the drain of the amplification MOS transistor of each pixel and also supplied as a reset voltage from the reset MOS transistor. The voltage of the voltage supply line 6a also serves as the driving voltage of the AND circuit 1g. The AND circuit outputs a pulse of 5 V, which is the voltage of the voltage supply line 6a.

The voltage of the voltage supply line 6b is supplied as the power supply voltage of the amplifier unit 2a, A/D conversion circuit 2b, and signal processing unit 2c in the signal processing block.

The second embodiment of the present invention will be described next.

Figure 7:
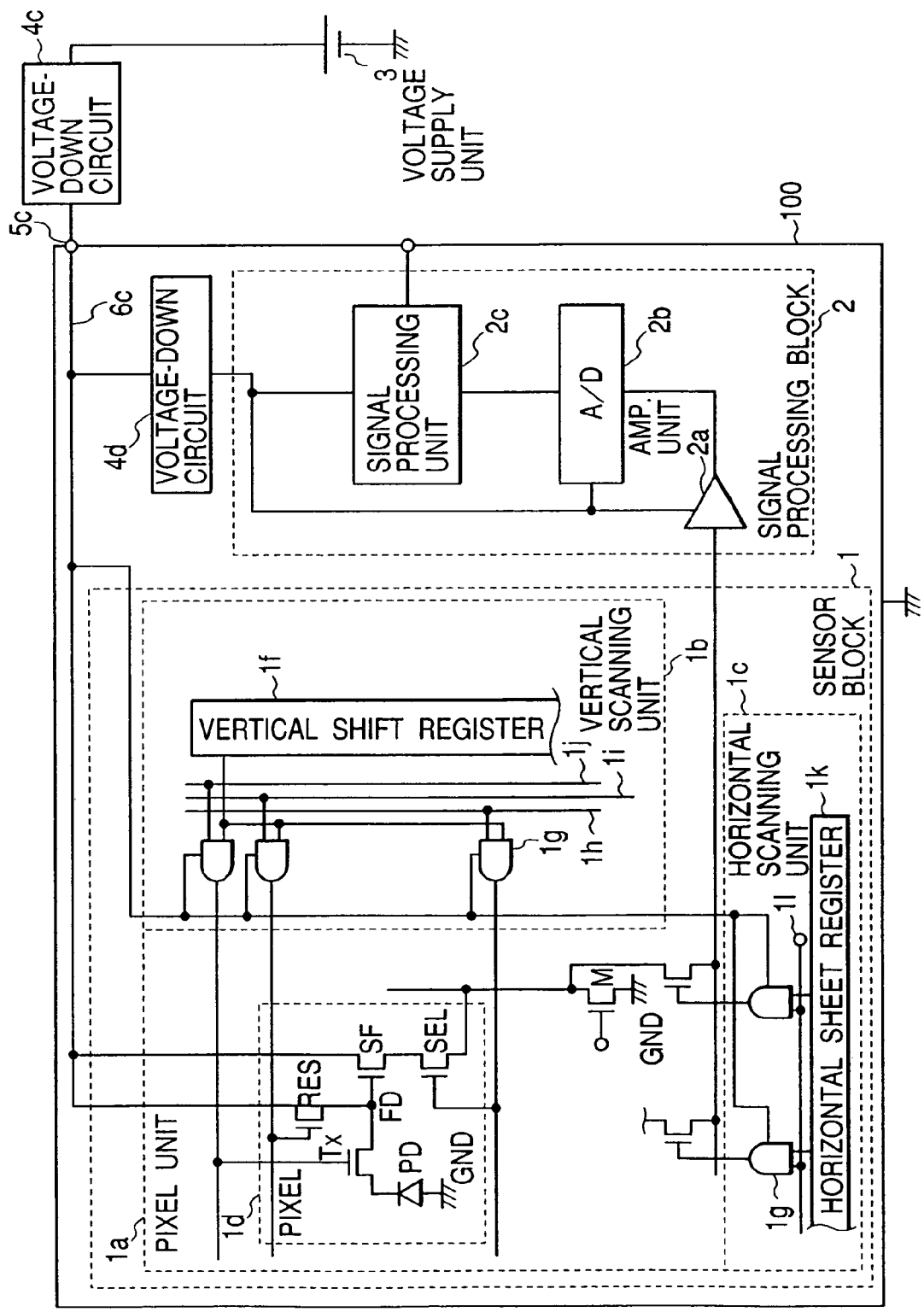
FIG. 7 is a block diagram showing the second embodiment.

FIG. 7 shows a specific circuit arrangement in which the power supply voltage of the sensor block is different from that of the signal processing block.

The second embodiment is the same as the first embodiment except that one voltage supply terminal 5c is prepared to supply a voltage, and a voltage-down circuit 4d is arranged in a sensor 100 to decrease the value of the voltage supplied from a voltage supply line 6c and use the voltage as the power supply voltage of the amplifier unit in the signal processing unit.

The voltage from the voltage supply unit is set at 5 V by a voltage-down circuit 4c. The voltage of 5 V is applied to the sensor block through the voltage supply line 6c. The voltage value of 5 V on the voltage supply line 6c is set at 4 V by the voltage-down circuit 4d, and the voltage of 4 V is applied to the signal processing block.

In the first and second embodiments, the power supply voltage having the same voltage value is supplied to all the circuit units in the signal processing block. However, the power supply voltage of the sensor block may be set at 6.5 V, that of the amplifier unit in the signal processing block may be set at 5 V, and that of the A/D conversion unit and signal processing unit in the signal processing block may be set at 3.3 V.

As a specific circuit arrangement, three voltage supply terminals may be prepared to apply different voltages from the terminals, respectively. Alternatively, one voltage supply terminal may be prepared, and two voltage-down circuits may be arranged in the sensor to generate three different voltages.

The image sensing apparatus of this embodiment, which has a pixel formed from a photodiode, can improve the S/N ratio and reduce the power consumption as compared to the prior art. The structure of a pixel is not limited to this, and another pixel structure having a function of converting an optical signal into charges and outputting them may be employed.

In the first and second embodiments, the power supply voltage of 5 V is supplied to the entire sensor block. In the third embodiment of the present invention, a high voltage of 6.5 V is supplied to only the reset signal line and row selection signal line of the pixel unit of the sensor block shown in FIG. 3, and a power supply voltage of 5.0 V is supplied to the remaining members of the sensor block. In this embodiment, the dynamic range can be extended by applying the high voltage of 6.5 V to the gates of a selection transistor SEL and reset transistor RES. The same effect as described above can be obtained even in the pixel structure shown in FIG. 8.

When the read circuit of the sensor block is constructed by a source follower circuit as shown in FIG. 8, the upper limit of the source follower circuit is one of the factors that determine the dynamic range of the sensor. This upper limit is generally a power supply voltage Vdd. When the same voltage Vdd is applied to the gate of the selection transistor SEL, the upper limit is a voltage lower than the power supply voltage Vdd by the threshold voltage of the selection transistor SEL. When a voltage higher than the power supply voltage Vdd is applied to the gate of the selection transistor SEL, the upper limit of the source follower circuit can be increased to the power supply voltage Vdd. For this reason, in this embodiment, the voltage of 6.5 V is applied to the row selection signal line of the pixel unit of the sensor block, which is connected to the gate of the selection transistor SEL.

Another factor that suppresses the dynamic range is the upper limit of the reset voltage. The source follower circuit has an input range from the reset voltage to a ground voltage GND. Hence, when the reset voltage is increased, the dynamic range can be widened. Like the selection transistor SEL, when the same voltage as the reset voltage is applied to the gate of the reset transistor RES, the reset voltage is limited to a voltage lower than the reset power supply voltage by the threshold voltage. However, when a sufficiently higher voltage is applied to the gate of the reset transistor RES, a voltage almost equal to the reset power supply voltage can be used as a reset voltage. For this reason, in this embodiment, the voltage of 6.5 V is supplied to the reset signal line of the pixel unit of the sensor block, which is connected to the gate of the reset transistor RES.

Figure 9:
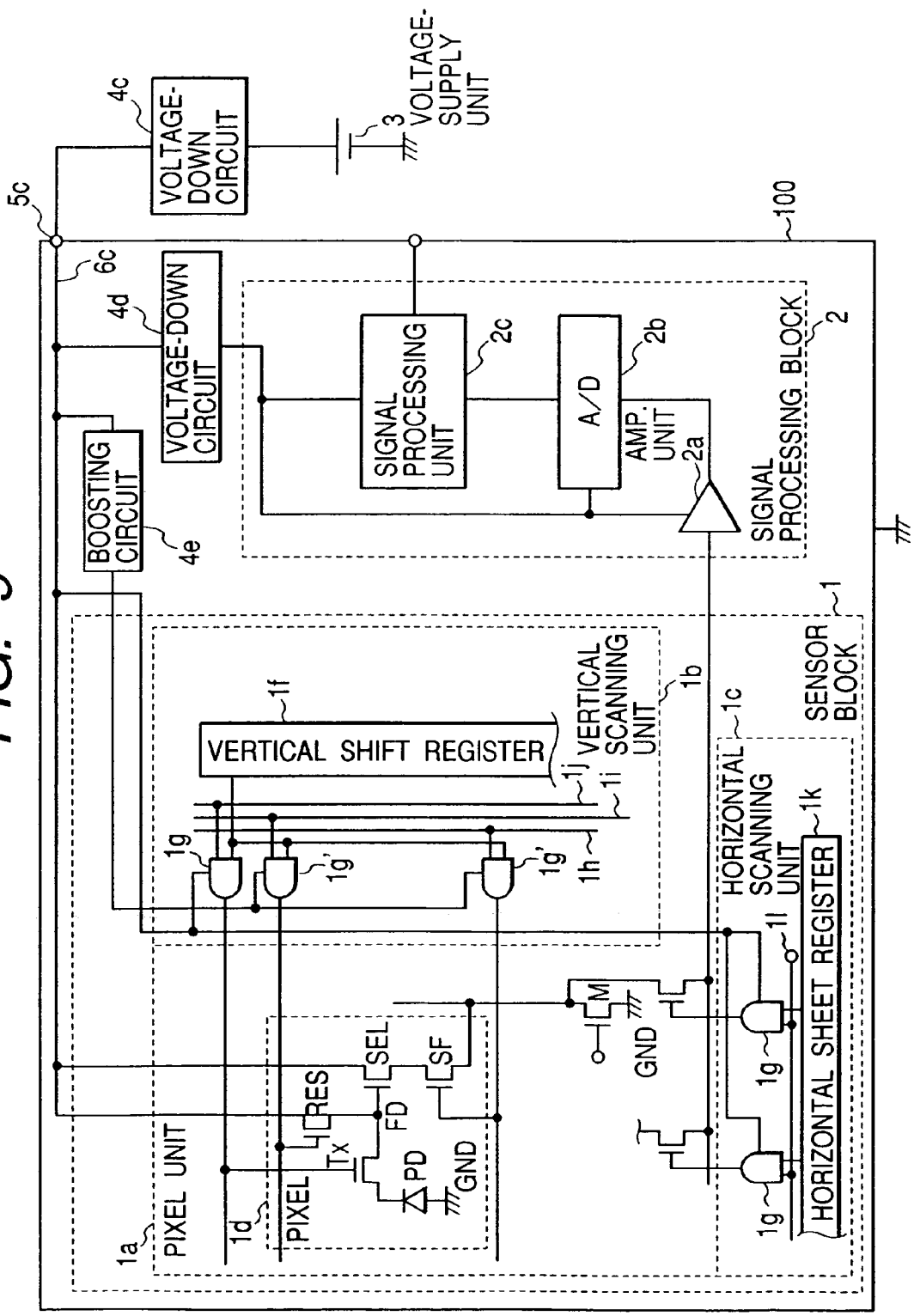
FIG. 9 is a block diagram showing the third embodiment.

FIG. 9 shows a specific circuit arrangement in which a voltage of 6.5 V is supplied to only the reset signal line and row selection signal line, and a voltage of 5.0 V is supplied to the remaining units of the sensor block.

In this embodiment, the voltage from a voltage supply unit is set at 5 V by a voltage-down circuit 4c and applied to a voltage supply terminal 5c. The voltage of a voltage supply line 6c, which is set at 5 V, is directly supplied to the drain of the selection MOS transistor as a power supply voltage, and is also supplied as the driving voltage of an AND circuit 1g. The voltage set at 6.5 V at a boosting circuit 4e is supplied to an AND circuit 1g'. The voltage set at 3.3 V by a voltage-down circuit 4d is supplied to the units in the signal processing block as a power supply voltage.

In the first to third embodiments, the power supply voltage of the sensor block is higher than that of the signal processing block. In the fourth embodiment of the present invention, the same power supply voltage is supplied to the sensor block and signal processing block. The high level of a clock signal used in the sensor block is made higher than the power supply voltage of the signal processing block.

Figure 10:
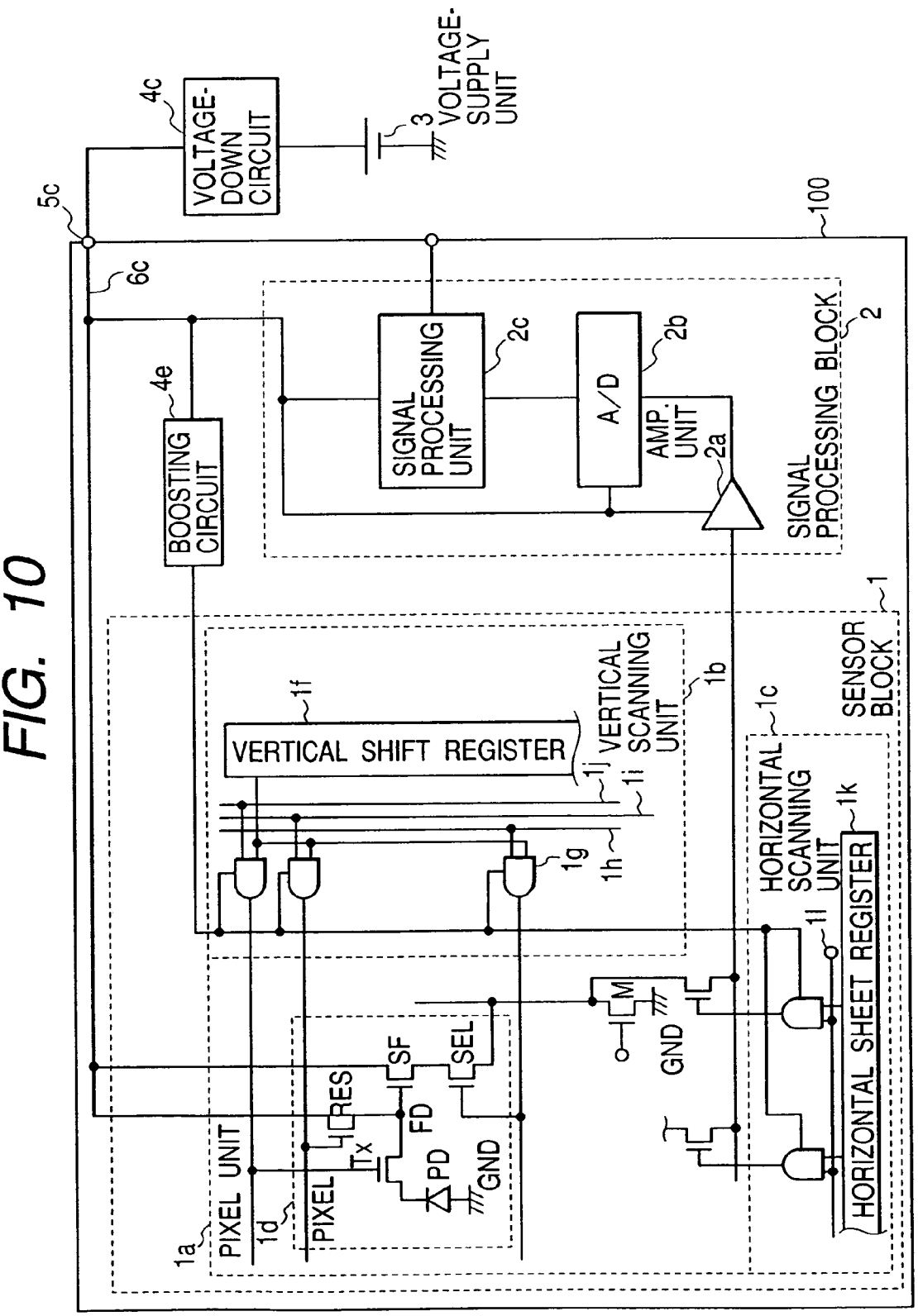
FIG. 10 is a block diagram showing the fourth embodiment.

A specific circuit arrangement will be described with reference to FIG. 10.

The voltage from a voltage supply unit 3 is set at 3.3 V by a voltage-down circuit 4c and supplied from a voltage supply terminal 5c. The voltage of the voltage supply line, which is set at 3.3 V, is supplied to the drain of the amplification MOS transistor as a power supply voltage and also supplied to the drain of the reset MOS transistor as a reset voltage. This voltage is also supplied to the units in the signal processing block as a power supply voltage.

In this embodiment, a boosting circuit is arranged in the sensor. The voltage of the voltage supply terminal is set at 5 V by a boosting circuit 4e and supplied as a driving voltage of an AND circuit 1g.

With this arrangement, the high level of the clock signal output from the AND circuit 1g becomes 5 V, i.e., higher than the power supply voltage of the signal processing block.

In the first to third embodiments, the power supply voltage of the sensor block is higher than that of the signal processing block. In the fifth embodiment of the present invention, the same power supply voltage is supplied to the sensor block and signal processing block. The amplitude of a clock signal used in the sensor block is made higher than the power supply voltage of the signal processing block.

Figure 11:
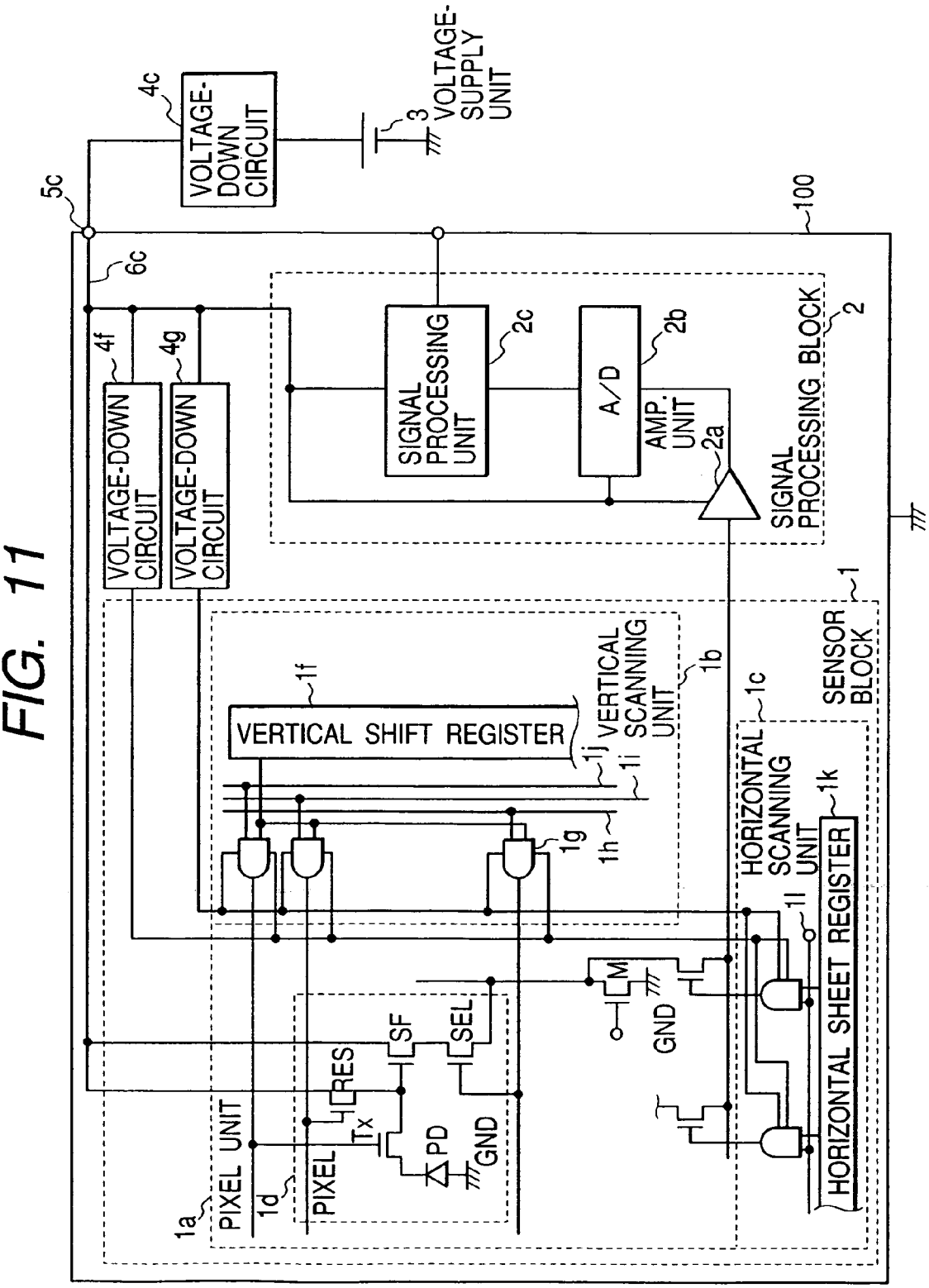
FIG. 11 is a block diagram showing the fifth embodiment.

A specific circuit arrangement will be described with reference to FIG. 11.

The voltage from a voltage supply unit 3 is set at 3.3 V by a voltage-down circuit 4c and supplied from a voltage supply terminal 5c. The voltage of the voltage supply line, which is set at 3.3 V, is supplied to the drain of the amplification MOS transistor as a power supply voltage and also supplied to the drain of the reset MOS transistor as a reset voltage. This voltage is also supplied to the units in the signal processing block as a power supply voltage.

In this embodiment, the sensor has two voltage-down circuits. The voltage of the voltage supply line is set at −2 V by a voltage-down circuit 4f. This voltage is used as the driving voltage of an AND circuit 1g. The voltage of the voltage supply line is also set at 3 V by a voltage-down circuit 4g. This voltage is used as the driving voltage of the AND circuit 1g.

With this arrangement, the amplitude of the clock signal output from the AND circuit 1g becomes 5 V, i.e., higher than the power supply voltage of the signal processing block.

The sixth embodiment of the present invention will be described next.

Figure 12:
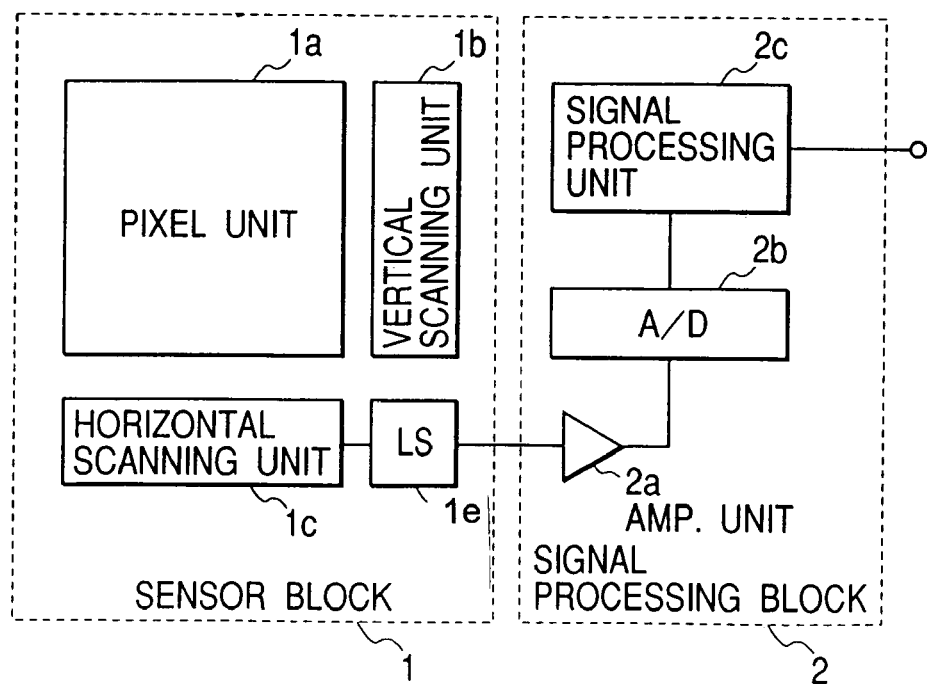
FIG. 12 is a block diagram showing a sensor.

The power supply voltage of a sensor block 1 is set at 6.5 V, and that of a signal processing block 2 is set at 3.3 V. In this embodiment, the sensor block 1 and signal processing block 2 have a power supply voltage difference. Hence, as shown in FIG. 12, a level shift circuit 1e for level-shifting the signal from a horizontal scanning unit 1c is prepared, and the output from the level shift circuit 1e is connected to an amplifier unit 2a. The level shift circuit need not be always used in the sensor block 1. This circuit may be inserted between the sensor block 1 and signal processing block 2 or in the signal processing block 2. The degree of freedom in design is higher when the level shift circuit is in the sensor block where the power supply voltage is high, and the input and output ranges are wide.

Figure 13:
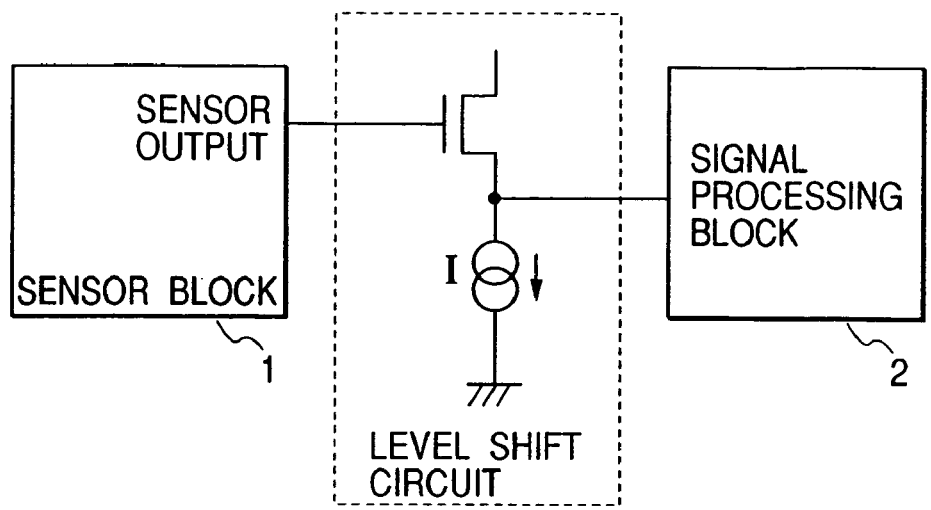
FIG. 13 is a block diagram showing a sensor.

The level shift circuit can have the simple structure of a source follower circuit having a MOS transistor and constant current source, as shown in FIG. 13. The power supply voltage of the sensor block can be made higher than that of the signal processing block by employing the arrangements of the first to third embodiments. In addition, the high level or amplitude of the block signal used in the sensor block can be made higher than the power supply voltage of the signal processing block by employing the arrangements of the fourth and fifth embodiments.

In the sixth embodiment, the power supply voltage of the sensor block is set at 6.5 V, and that of the signal processing block is set at 3.3 V. In the seventh embodiment of the present invention, to increase the breakdown voltage of the MOS transistor used in the sensor block, the gate oxide layer of the MOS transistor is made thick or the well density is lowered. Both the gate oxide layer thickness and well density may be controlled. When the gate oxide layer is thick, the threshold voltage of the MOS transistor used in the sensor block becomes higher than that of the MOS transistor used in the signal processing block.

More specifically, when the oxide layer thickness of the MOS transistor used in the sensor block is 20 nm, and that in the signal processing block is 8 nm, the breakdown voltage of the MOS transistor used in the sensor block increases.

Similarly, when the well density of the MOS transistor used in the sensor block is $4 \times 10^{16}/cm^3$, and that in the signal processing block is $8 \times 10^{16}/cm^3$, the breakdown voltage of the MOS transistor used in the sensor block increases.

In the first to third embodiments as well, the breakdown voltage of the MOS transistor used in the sensor block may be increased.

The arrangements of the sensor block and signal processing block of the present invention are not limited to the above-described embodiments.

Figure 14:
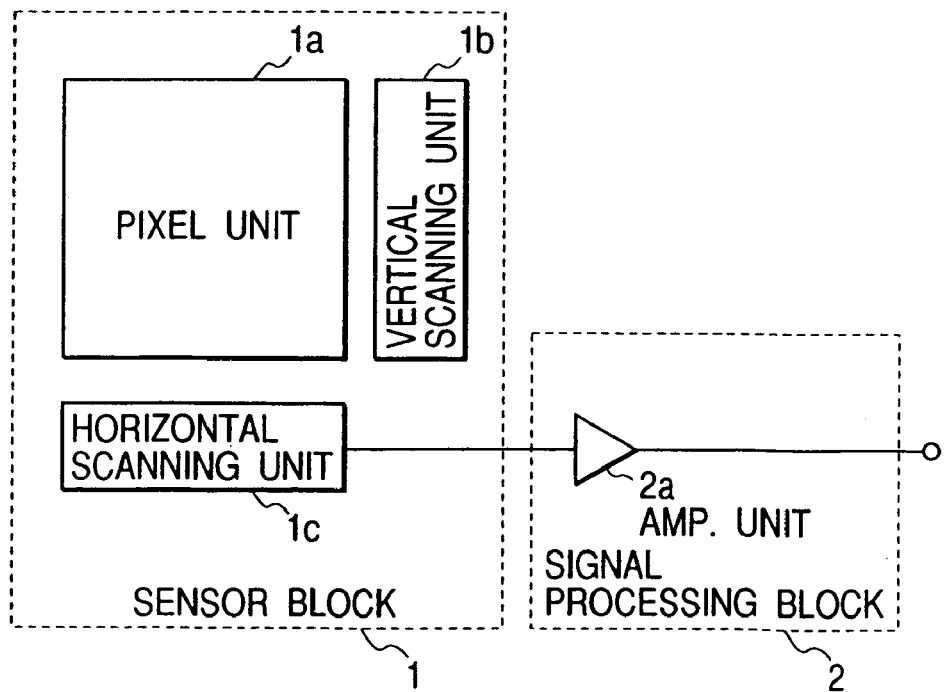
FIG. 14 is a block diagram showing a sensor.

For example, the signal processing block may have only the amplifier unit 2a, as shown in FIG. 14. The sensor block may have a means for reading out a noise signal and subtracting the noise component contained in the sensor signal, as will be described later.

Figure 15:
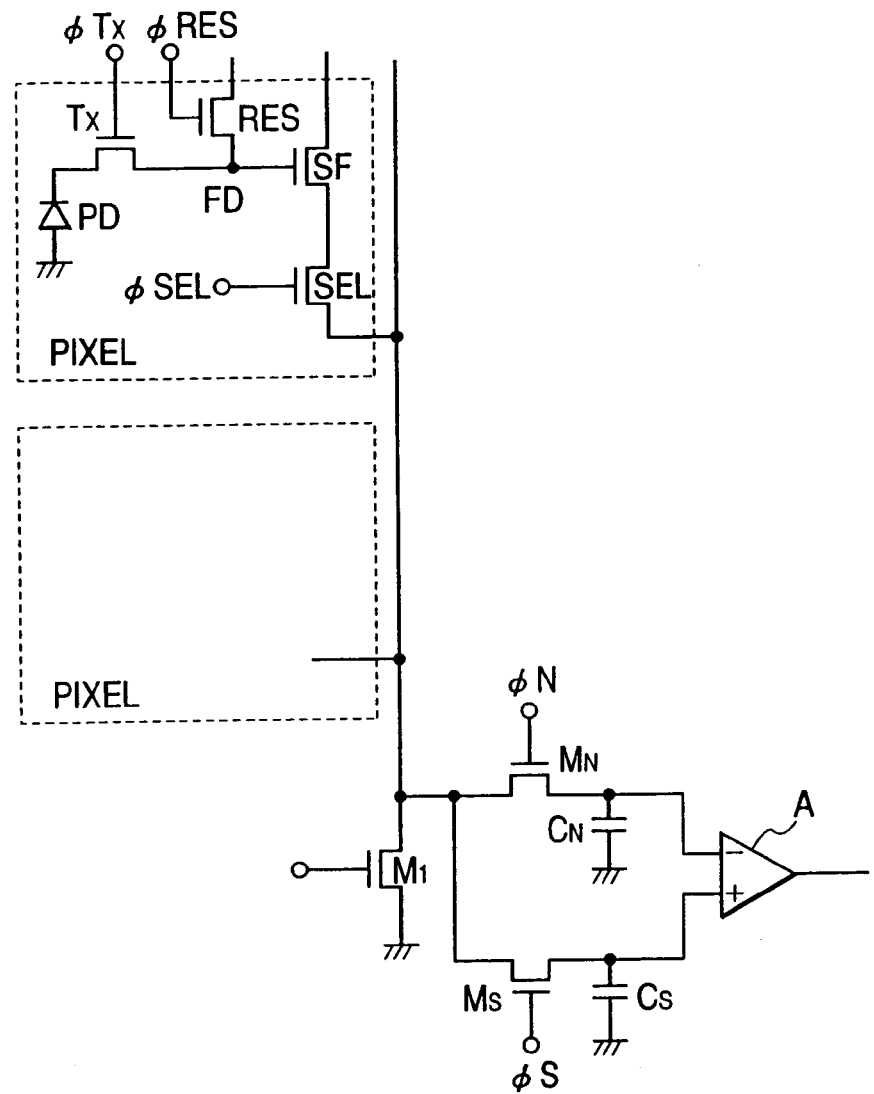
FIG. 15 is a view showing a pixel unit.

FIG. 15 shows a circuit arrangement for removing a noise component from the sensor signal from each pixel. One pixel shown in FIG. 15 has the same arrangement as that shown in FIG. 3.

As shown in FIG. 15, the vertical output line connected to a plurality of pixels is connected to a noise signal transfer MOS transistor MN and sensor signal transfer MOS transistor MS. The noise signal and sensor signal are stored in storage capacitances CN and CS, respectively. The noise signal stored in the storage capacitance CN is subtracted from the sensor signal stored in the storage capacitance CS by a subtractor A, so the sensor signal without any noise component is output. In the area sensor having pixels arrayed in a matrix, the MOS transistors MN and MS and storage capacitances CN and CS are arranged in units of vertical output lines. The noise signals and sensor signals from pixels of one line are sequentially transferred to the subtractor A by the horizontal scanning unit in units of vertical output lines to perform subtraction.

Pulse signals φTX, φRES, φSEL, φN, and φS control a transfer MOS transistor TX, reset MOS transistor RES, selection MOS transistor SEL, noise signal transfer MOS transistor MN, and sensor signal transfer MOS transistor MS, respectively.

Figure 16:
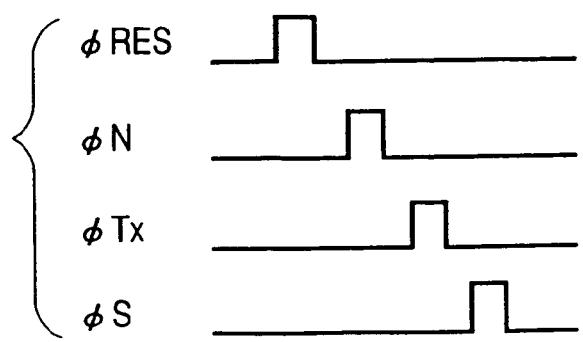
FIG. 16 is a timing chart showing a pixel read.

FIG. 16 is a timing chart for explaining the operation of the circuit shown in FIG. 15. First, the pulse signal φES is set at high level to reset the floating diffusion region (FD). After that, the pulse signal φN is set at high level to transfer the noise signal to the storage capacitance CN. Next, the pulse signal φTX is set at high level to transfer signal charges from the photodiode PD to the floating diffusion region, and the pulse signal φS is set at high level to transfer the sensor signal (containing a noise component) to the storage capacitance CS. The noise signal stored in the storage capacitance CN is subtracted from the sensor signal in the storage capacitance CS by the subtractor A to output the sensor signal without any noise component.

The eighth embodiment of the present invention will be described next.

Figure 17:
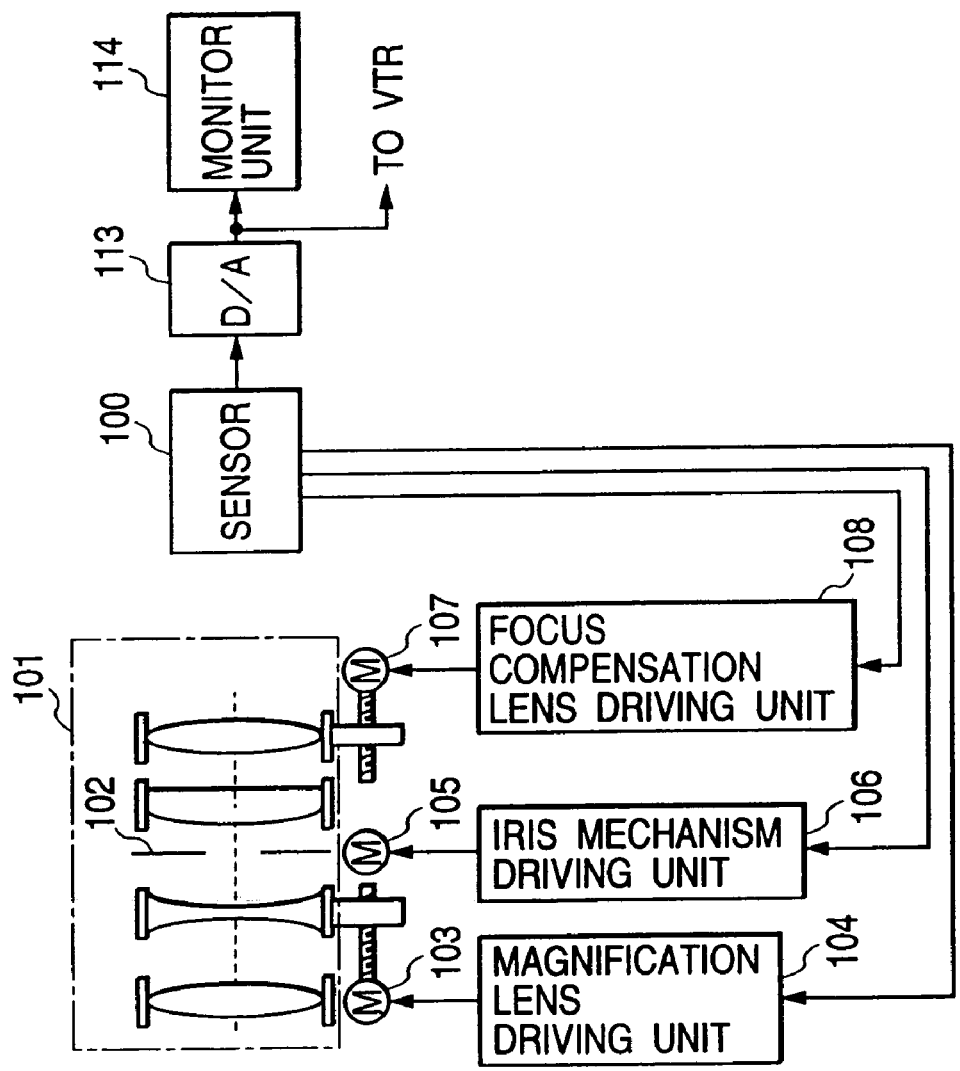
FIG. 17 is a block diagram showing an image sensing apparatus.

FIG. 17 is a block diagram showing an image sensing apparatus using a sensor 100 described above.

Referring to FIG. 17, the image sensing apparatus has a lens system 101, iris 102, motors 103, 105, and 107, magnification lens driving unit 104 for controlling the motor 103, iris mechanism driving unit 106 for controlling the motor 105 to drive the iris 102, and focus compensation lens driving unit 108 for controlling the motor 107. The sensor 100 photoelectrically converts an optical signal input from the lens system 101 and executes predetermined signal processing. The magnification lens driving unit 104, iris mechanism driving unit 106, and focus compensation lens driving unit 108 are controlled by a microcomputer 115 in the sensor.

The output from the sensor 100 is sent to a monitor unit 114 through a digital decoder and D/A converter 113 for image display and also sent to a VTR.

The ninth embodiment of the present invention will be described next.

Figure 18:
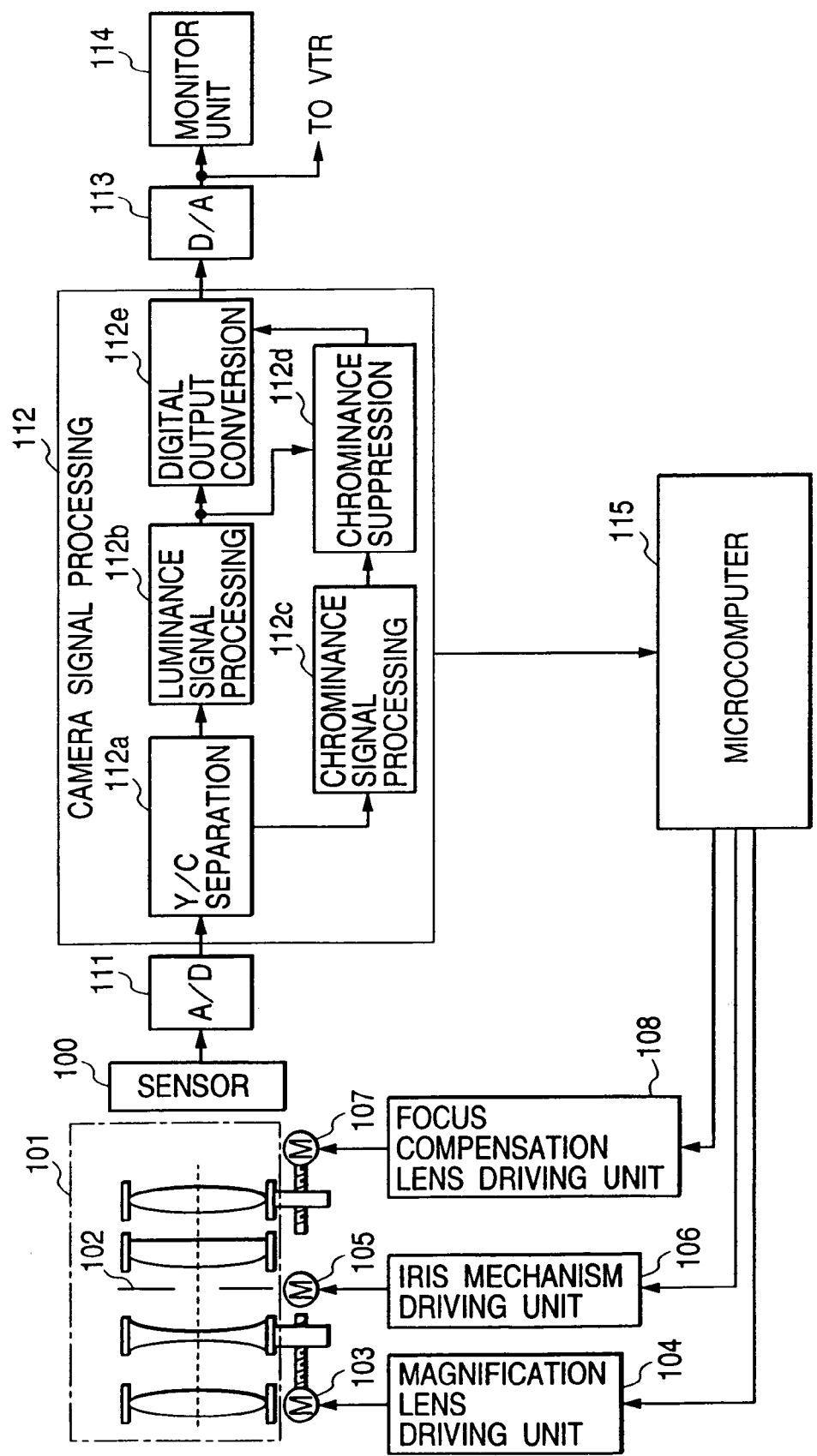
FIG. 18 is a block diagram showing an image sensing apparatus.

FIG. 18 is a block diagram showing an image sensing apparatus using a sensor 100 described above, in which the signal processing block has only an amplifier unit.

Referring to FIG. 18, the image sensing apparatus has a lens system 101, iris 102, motors 103, 105, and 107, magnification lens driving unit 104 for controlling the motor 103, iris mechanism driving unit 106 for controlling the motor 105 to drive the iris 102, and focus compensation lens driving unit 108 for controlling the motor 107. The sensor 100 photoelectrically converts an optical signal input from the lens system 101, and amplifies and outputs it. The image sensing apparatus also has an A/D converter 111.

A camera signal processing circuit 112 corresponding to a signal processing unit 2c of this embodiment has a Y/C separation circuit 112a, luminance signal processing circuit 112b, chrominance signal processing circuit 112c, chrominance suppression circuit 112d, and digital output conversion circuit 112e. The luminance and chrominance signals are input to a microcomputer 115. The microcomputer 115 controls the magnification lens driving unit 104, iris mechanism driving unit 106, and focus compensation lens driving unit 108 on the basis of the signals.

The output from the camera signal processing circuit 112 is sent to a monitor unit 114 through a digital decoder and D/A converter 113 for image display and also sent to a VTR.

An area sensor has been described in the above embodiments. However, the present invention can also be applied to a line sensor. A line sensor has the same pixel structure as described above except the selection switch in a pixel is omitted.

As described above, according to this embodiment, the dynamic range can be widened, noise can be reduced, and the power consumption can be reduced.

In the first to ninth embodiments, the power consumption can be reduced especially by integrating the sensor block and signal processing block on a single semiconductor substrate by the CMOS process.

Figure 19:
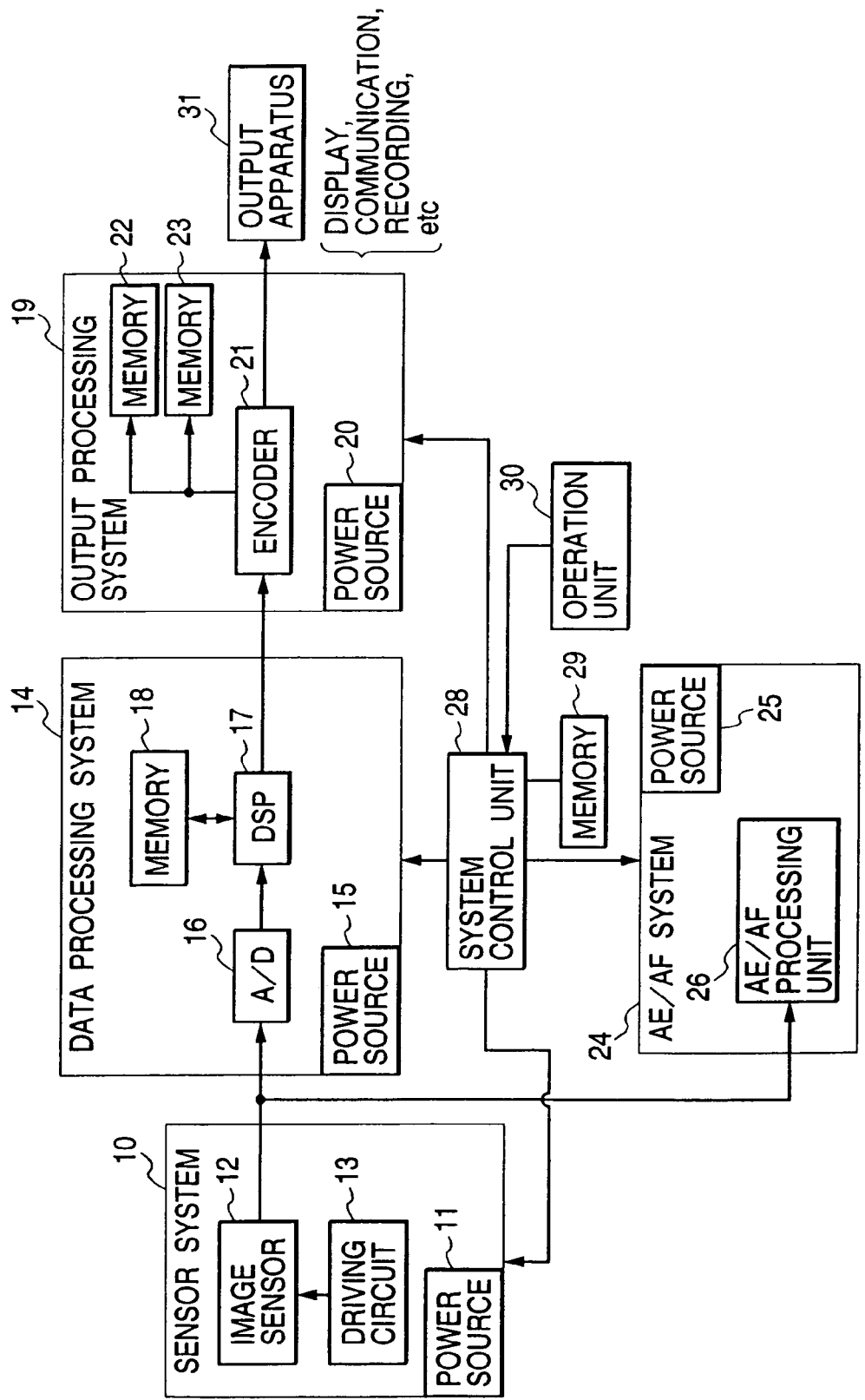
FIG. 19 is a block diagram showing a system according to the 10th embodiment.

FIG. 19 is a block diagram showing the arrangement of an image sensing apparatus according to the 10th embodiment of the present invention. In this image sensing apparatus, a sensor system 10 constructed by an image sensor 12 and driving circuit 13 therefor has one independent power source 11. A data processing system 14 having an A/D conversion unit 16 for A/D-converting an image sensing data signal from the image sensor 12 and DSP unit 17 for performing arithmetic operation while storing the data in a memory 18 has an independent power source 15. An output processing system 19 also has a power source 20, in which a plurality of memories 22 and 23 are prepared to convert the image sensing data from the data processing system 14 into a data structure compatible with the output apparatus 31, and an encoder 21 encodes the data to display, communicate, or record it. An AE/AF system 24 where AE/AF conditions for image sensing are calculated by an AE/AF processing unit 26 also has a power source 25. The operation mode is identified in accordance with the signal from an operation unit 30 of the apparatus, and a system control unit 28 including a memory 29 determines the ON/OFF timing of power supply to each processing system.

The output apparatus to which the image sensing apparatus outputs data is a display apparatus such as a liquid crystal display panel, CRT panel, spontaneous emission panel having electron-emitting elements, or PDP, a printer for printing on paper, a communication apparatus using the Internet or radio communication, or a recording driver for storing data in on a recording medium such as a floppy disk or CD-RAM. These output apparatuses have prescribed data formats, respectively, so data is encoded onto a data structure corresponding to each format and output.

FIG. 20 shows the relationship between the operation modes of the image sensing apparatus and power supply states of the processing systems. For example, when the shutter button of the image sensing apparatus is at a half stroke position, the system control unit 28 identifies (1) AE/AF calculation mode in accordance with the operation signal from the operation unit 30, and turns on only power supply to the AE/AF system 24 and sensor system 10. The power sources 11 and 25 are turned on, and the power sources 15 and 20 of the data processing system 14 and output processing system 19, which are not used, are turned off. In this operation mode, the automatic exposure adjustment value of the exposure time is set in the memory 29 of the system control unit 28, and the position of the movable lens is adjusted and set in accordance with the focal length on the basis of the image sensing signal from the sensor system 10.

When the shutter button of the operation unit 30 is at the full stroke position, the system control unit 28 identifies (2) image sensing mode in accordance with the operation signal from the operation unit 30. The system control unit 28 turns on only the power sources 11 and 15 of the sensor system 10 and data processing system 14 and turns off the power sources 20 and 25 of the AE/AF system 24 and output processing system 19 which are not in use. In this operation mode, the image sensing signal is output from the sensor system 10 of the image sensing apparatus. The data processing system 14 clamps and samples/holds the image sensing signal. The signal is output from the A/D conversion unit 16 as a digital signal. The DSP unit 17 executes shading correction or gamma correction using the memory 18 to output image sensing data.

For communication, recording, or printout of the image sensing data, (3) data output mode is selected as the operation mode by the button of the operation unit 30. In this mode, the power sources 20 and 15 of the output processing system 19 and data processing system 14 are turned on, and the power sources 25 and 11 of the AE/AF system 24 and sensor system 10 not in use are turned off. In this operation mode, to output the data to a communication system, the image sensing data is converted into, e.g., an NTSC video signal or an MPEG2 compressed image signal by the encoder 21 and output to the communication transmission line. To output the data to a recording system, the image sensing data is converted by the encoder 21 into a video signal for a magnetic tape of VHS, SVHS, or Hi8 8-mm or an MPEG1 or MPEG2 compressed image signal for a CD-R, DVD-RAM, or DVD-RW, and recorded. Alternatively, image sensing data for a still image is converted into a TIFF (Tagged Image File Format: an image standard file having an attribute as tag information) for a printer and printed.

The power consumption can be reduced by turning off the power sources of processing systems not in use in accordance with the operation mode.

FIGS. 21A to 21D show the ON/OFF timings of power supply to the processing systems. Switching the power supply readily generates large noise. To prevent this from adversely affecting the image sensing data, power supply is turned on/off during a period except the vertical effective period, i.e., during the vertical scanning blanking period. If switching is done in the horizontal scanning blanking period, one frame image is interrupted midway. Hence, when the power sources of the processing systems are turned on or off during the vertical scanning blanking period, any influence on the image can be eliminated. In this vertical effective period, image sensing scanning of the sensor system 10 is controlled on the basis of the clock signal of the system control unit 28. For this reason, the power ON/OFF timings of the sensor system 10, data processing system 14, and output processing system 19 can also be controlled by the system control unit 28.

FIGS. 21C and 21D show the rise and fall waveforms in switching the power sources. To attain correct matching for image sensing data between the processing systems before and after switching the power sources, the memory operation clock shown in FIG. 21B is stopped when the power source waveform has sufficiently fallen. Similarly, the memory operation clock is started when the power source waveform has sufficiently risen. This prevents any operation clock shift between the processing systems, so matching between image sensing data is ensured.

Figure 1:
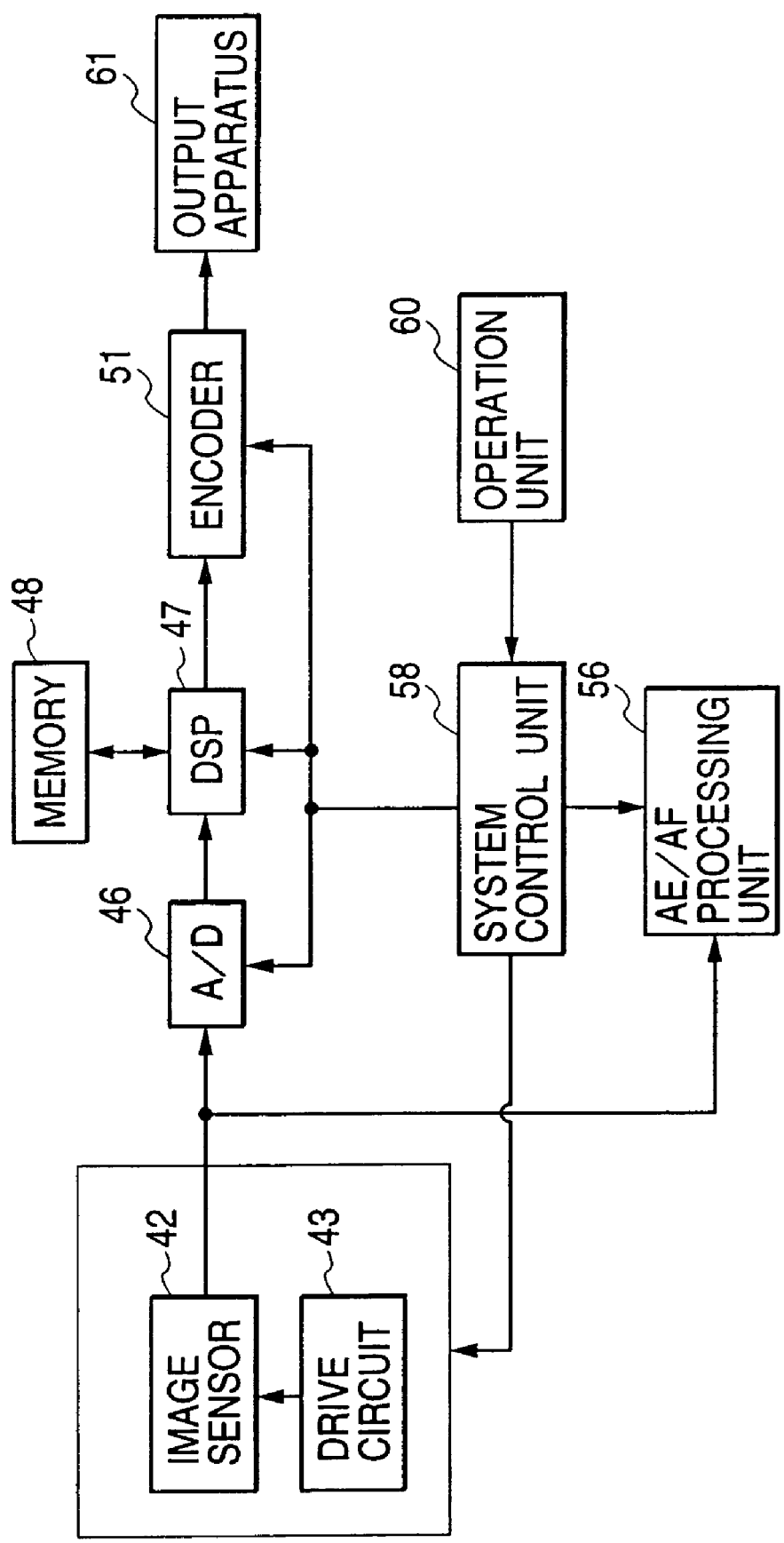
FIG. 1 is a block diagram showing a prior art.

In the above-described embodiment of the present invention, the power source units of the respective processing systems are ON/OFF-controlled. In the present invention, the operation clock may be controlled. In this case, the operation clock (not shown in FIG. 1) is ON/OFF-controlled in units of processing systems.

Figure 22:
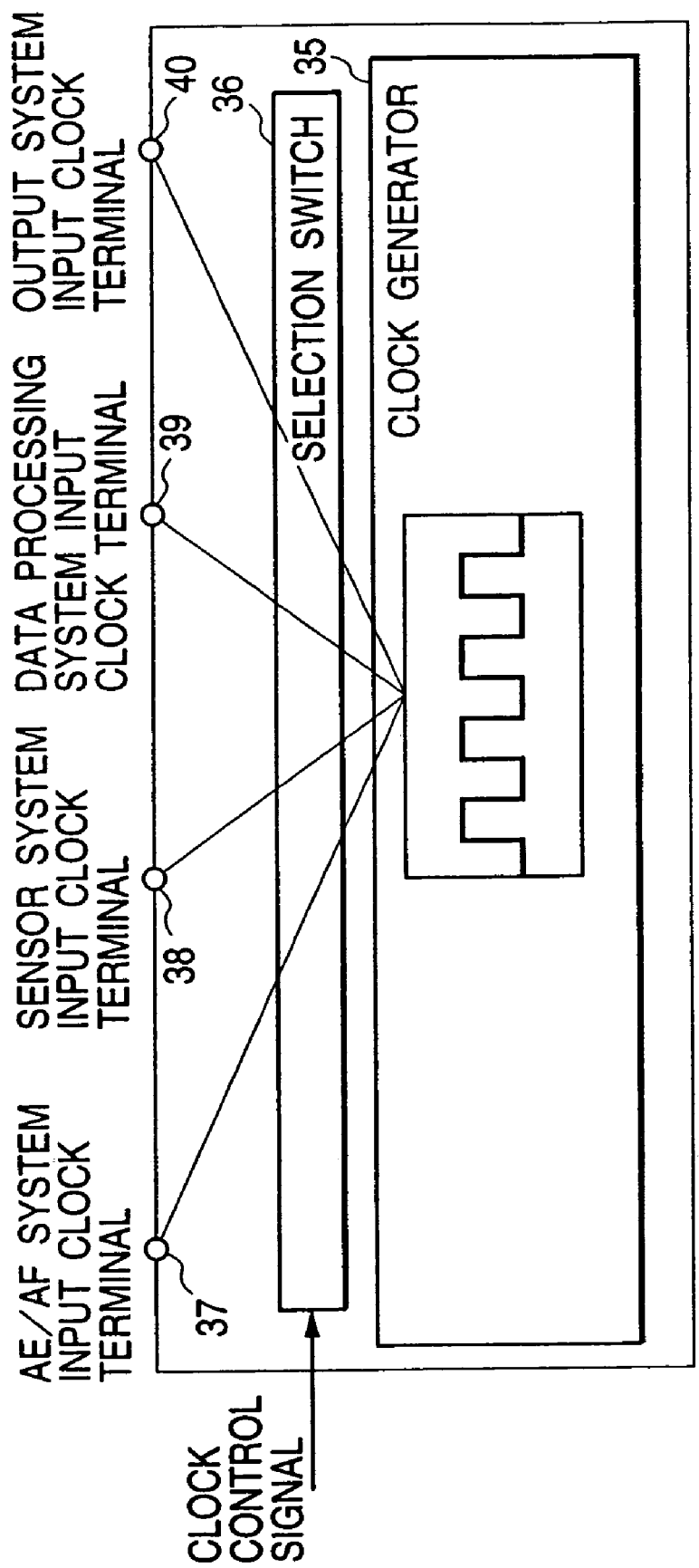
FIG. 22 is a view showing the concept of an operation clock control circuit of the 10th embodiment.

FIG. 22 shows an example of such operation clock control circuit. In this example, a clock generator 35 is connected to input clock terminals 37 to 40 of the processing systems through a selection switch 36 capable of switching in accordance with an instruction via a clock control signal line. When the input clock terminals 37 to 40 of the processing systems are disconnected from the clock generator 35 in accordance with an instruction of a clock control signal, the input clock to the processing system is stopped. The clock signal from the clock generator 35 is managed by the system control unit 28. When the vertical effective period is managed, and the power sources of the processing systems are ON/OFF-controlled during a period except the vertical effective period, any influence on the image signal can be prevented.

In the above embodiment, the sensor system 10, data processing system 14, output processing system 19, and AE/AF system 24 are independent from each other. These processing systems can be integrated in one chip as a SOC (System On Chip). For example, the power consumption of the circuit can be reduced by forming all processing systems on one chip by the CMOS process. In addition, since the power sources of the processing systems can be turned on/off in accordance with the operation mode, the power consumption can be further reduced.

According to this embodiment, the power consumption can be reduced by turning off the power sources or operation clocks of processing systems that are unnecessary for operation of the image sensing apparatus.

When the power sources or operation clocks are turned off or on during a period except the vertical effective period of a video signal, the influence of noise due to ON/OFF of the power sources or operation clocks can be prevented from being output to the video signal, and low power consumption and low noise can be achieved.

When the power sources or operation clocks are turned off or on as shown in FIGS. 21A to 21D, the processing systems can be operated in synchronism with each other, matching between image sensing data is ensured, and image sensing data without any shift can be obtained.

When circuits including the processing systems and the control units thereof are formed in a one-chip LSI, the image sensing apparatus can be made compact and lightweight, and the power consumption can be reduced.

Figure 23:
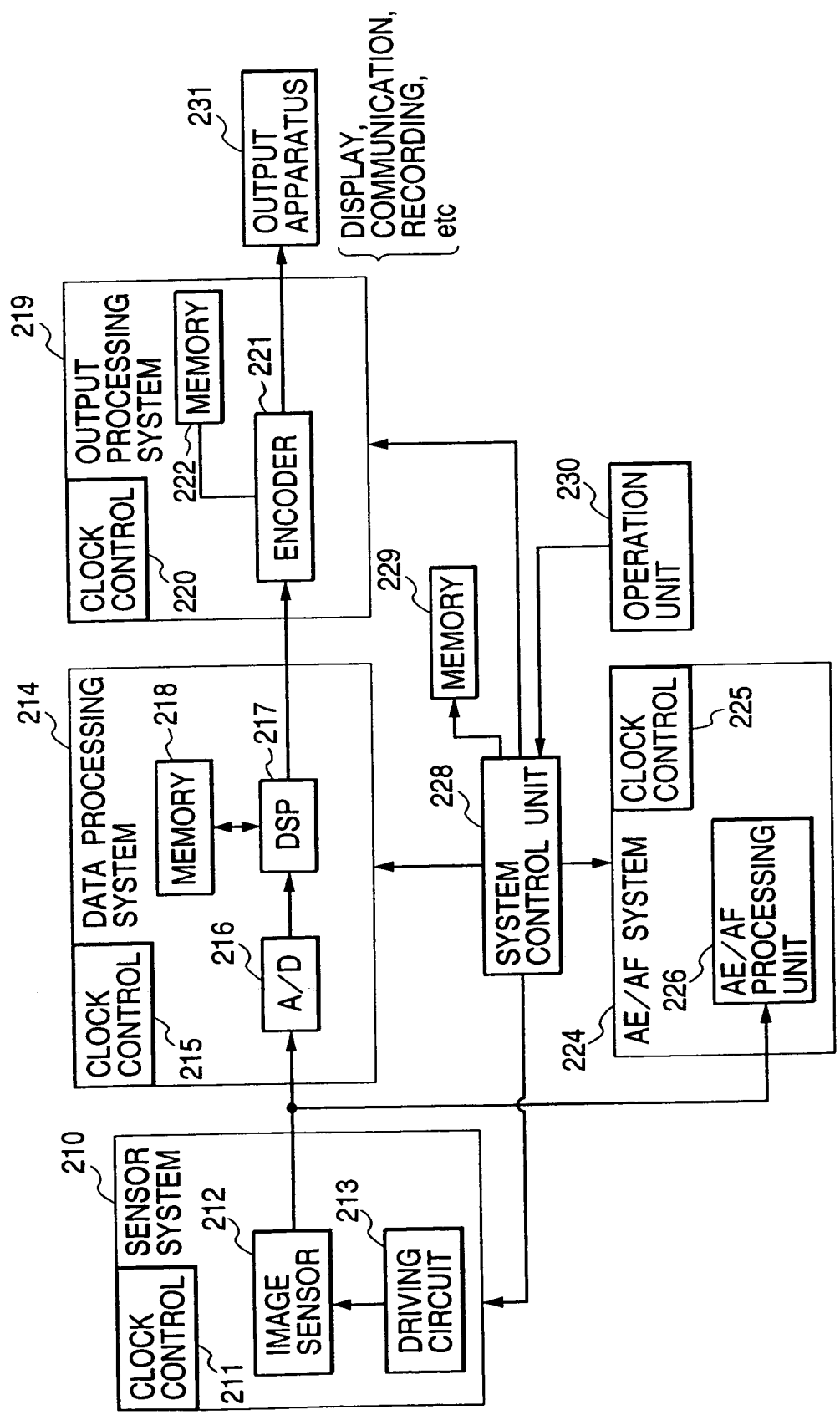
FIG. 23 is a block diagram showing a system according to the 11th embodiment.

FIG. 23 is a block diagram showing the arrangement of an image sensing apparatus according to the 11th embodiment of the present invention. Each of the sensor system, AE/AF system, data processing system, and output system has a clock control circuit for controlling the operation clock. The operation mode of the apparatus is identified in accordance with the signal from the operation unit, a clock control signal is sent from the system control unit to the clock control circuit of a designated processing system, and the frequency of the input clock is changed.

As a characteristic feature of this embodiment, the input clock frequencies to the processing systems can be independently changed by executing instructions for controlling the clock control circuits.

FIG. 23 is a block diagram showing the arrangement of a solid-state image sensing apparatus according to the 11th embodiment of the present invention. In this image sensing apparatus, a sensor system 210 constructed by an image sensor 212 and driving circuit 213 therefor has one independent clock control unit 211. A data processing system 214 has an A/D conversion unit 216 for A/D-converting an image sensing data signal from the image sensor 212 and DSP unit 217 for performing arithmetic operation while storing the data in a memory 218. The data processing system 214 also has a clock control unit 215. An output processing system 219 has a clock control unit 220, a plurality of memories 222 for converting the image sensing data from the data processing system 214 into a data structure compatible with the output apparatus 231, and an encoder 221 for encoding the data to display, communicate, or record it.

An AE/AF system 224 where AE/AF conditions for image sensing are calculated by an AE/AF processing unit 226 also has a clock control unit 225. The operation mode is identified in accordance with the signal from an operation unit 230 of the apparatus, and a system control unit 228 including a memory 229 determines the timing of supplying and changing the control signal to the clock control unit of each processing system.

The output apparatus to which the solid-state image sensing apparatus outputs data is a display apparatus such as a liquid crystal display panel, CRT panel, spontaneous emission panel having electron-emitting elements, or PDP, a printer for printing on paper, a communication apparatus using the Internet or radio communication, or a recording driver for storing data in on a recording medium such as a floppy disk or CD-RAM. These output apparatuses have prescribed data formats, respectively, so data is encoded by the encoder 221 onto a data structure corresponding to each format and output.

FIGS. 24A to 24D show examples of the clock control circuit. In this embodiment, the input clock by the clock control unit of each processing system is thinned out (frequency-divided) to a plurality of types in accordance with the control signal. To do this, the input clock frequency is selected in accordance with the required operation rate of each processing system. For example, when the operation rate of a processing system can be 50% at maximum, the maximum input clock frequency is thinned out to ½. If the operation rate can be lower and at 25% the maximum rate, the clock frequency is further thinned out to ½. By lowering the clock frequency, the power consumption can be reduced. To change the clock frequency by another method, a plurality of clock generators with different frequencies may be prepared in units of processing systems to select the input clock frequency from these frequencies, or the duty ratio of the fundamental clock is changed, as shown in the waveform chart in FIG. 24D. In this case, a clock signal is generated by the system control unit 228. A common clock signal is supplied to the processing systems while a clock control signal is output.

Figure 25:
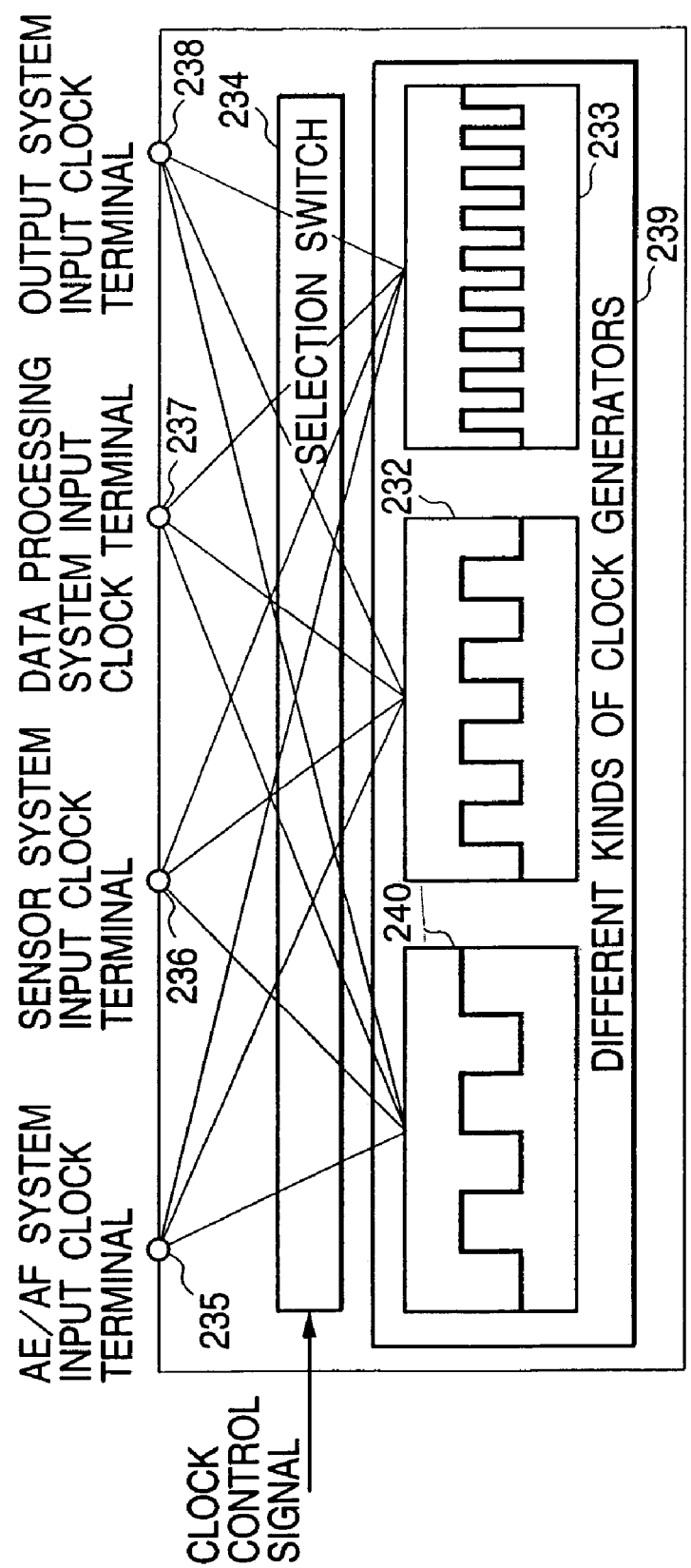
FIG. 25 is a view showing the concept of an operation clock control circuit of the 11th embodiment.

FIG. 25 shows another example of the clock control circuit. In this example, a plurality of clock generators with different frequencies are connected to the input clock terminals of the processing systems through a switch capable of switching in the clock control unit in accordance with an instruction via a clock control signal line. When the connection relationships are changed in accordance with an instruction, the input clock frequency of each processing system can be changed.

Referring to FIG. 25, a clock generator 239 is prepared in the system control unit 228 or a block not shown in FIG. 22. Different kinds of clock signals from a 100% clock generator 233, 50% clock generator 232, and 25% clock generator 240 are selected by a selection switch 234 and output to input clock terminals 235 to 238 of the processing systems.

FIG. 26 shows the relationship between the operation modes of the image sensing apparatus and operation states of the processing systems. Each operation state represents the state when the operation ratio at the maximum operation frequency is 100%. For example, an operation ratio of 5% is the operation state when the input clock of the processing system is set at ½ the maximum operation frequency.

The operation conditions will be described in more detail. As shown in FIG. 26, when the shutter button of the image sensing apparatus is at the half stroke position, the system control unit 228 identifies (1) AE/AF calculation mode in accordance with the signal from the operation unit 230 and controls the clock such that the AE/AF system operates at 100%, and the sensor system operates at 50% because thinning-out suffices for this system. At this time, the data processing system 214 and output processing system 219 are rarely used and therefore can operate at 25% or less.

When the shutter button is at the full stroke position, the system control unit 228 identifies (2) image sensing mode and control the clock such that the sensor system 210 and data processing system 214 operates at 100%. At this time, the data processing system 214 and output processing system 219 are rarely used and therefore controlled to an operation ratio of 25% or less.

When an operation mode is selected by a button for communicating or recording the image sensing data, the system control unit 228 identifies (3) data output mode and controls the clock such that the output processing system 219 operates at 100%, and the data processing system 214 operates at 50% or less assuming that it partially operates. At this time, the AE/AF system 224 and sensor system 210 are rarely used and therefore controlled to an operation ratio of 25% or less.

As described above, when the input clock frequencies of the processing systems are respectively set at optimum frequencies in accordance with the operation mode such that the input clock of a processing system with large load is set at a high frequency and a processing system with small load is set at a low frequency, the power consumption can be reduced. Unlike the technique of ON/OFF-controlling the power sources to reduce the power consumption, processing systems that are not in use also operate at a low speed. For this reason, the time of shift from the stand-by state to the start can be shortened. Matching in operation timing between the processing systems has no problems.

More power saving and power consumption reduction can be attained by controlling both the clock and power ON/OFF timings. With clock control, the operation can be immediately started, changed, or stopped in accordance with the control signal from the system control unit 228. ON/OFF control of a power source can produce a high power consumption reduction effect. However, although the control switch is operated at a high speed by electron control of a MOSFET or the like, ON/OFF control of a power source line requires certain time. Hence, the power source is turned off when a 25% clock is supplied by clock control. In the AE/AF calculation mode, the power sources of the AE/AF system 224 and sensor system 210 are turned on first. When the power source lines stabilize, a 100% clock is supplied to the AE/AF system 224, and a 50% clock is supplied to the sensor system 210, thereby causing the AE/AF system 224 to set the exposure time and lens position. With this arrangement, not only low power consumption but also immediate start of operation simultaneously with clock supply can be realized.

According to this embodiment, the operation clock frequency of a processing system which is not necessary for the operation of the solid-state image sensing apparatus including a plurality of processing systems is changed in accordance with a clock control instruction to set a low clock frequency, and the power consumption can be reduced.

When clock generators capable of independently changing the input clock frequencies to the processing systems are prepared in the clock control means in the image sensing apparatus in units of processing systems, an optimum clock for operation of each processing system can be set.

When the clock control means has a means for controlling the clock frequency of each processing system on the basis of the clock control signal, a plurality of clock generators with different frequencies can be commonly used as a single clock generator in the entire system.

When circuits including the processing systems and the control units thereof are formed in a one-chip LSI, the image sensing apparatus can be made compact and lightweight, and the power consumption can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sensor integrated on a single semiconductor substrate, comprising:
   a sensor block including a pixel unit and a scanning unit for selecting a pixel of the pixel unit, the pixel unit comprising a plurality of pixels each including a light-receiving element, a floating diffusion region, a transfer MOS transistor for transferring an electric carrier in the light-receiving element to the floating diffusion region, an amplifying MOS transistor having a gate connected to the floating diffusion region, and a reset MOS transistor for resetting the electric carrier in the floating diffusion region;
   a signal processing block for processing a signal output from said sensor block;
   a single electric power voltage input terminal for externally inputting an electric power voltage from outside of the substrate;
   a first level shift means disposed on the substrate for level shifting a voltage supplied from the single electric power voltage input terminal to generate a first voltage, and for supplying the first voltage to a gate of the reset MOS transistor, wherein the first voltage is larger than a voltage supplied to a drain of the amplifying MOS transistor of the pixel; and
   a second level shift means disposed on the substrate for level shifting a voltage supplied from the single electric power voltage input terminal to generate a second voltage, and for supplying a second voltage to the signal processing block, wherein the second voltage is smaller in amplitude than the first voltage.

2. A sensor according to claim 1, wherein a gate insulating layer of at least some insulated gate transistors of said sensor block is thicker than that of an insulated gate transistor used in said signal processing block.

3. A sensor according to claim 1, wherein a well density of at least some insulated gate transistors of said sensor block is lower than that of an insulated gate transistor used in said signal processing block.

4. A sensor according to claim 1, wherein a threshold voltage of at least some insulated gate transistors of said sensor block is higher than that of an insulated gate transistor used in said signal processing block.

5. A sensor according to claim 1, wherein the light-receiving element is a buried photodiode.

6. A sensor according to claim 1, wherein said sensor block and said signal processing block are connected via a level shift circuit for shifting a signal level.

7. A sensor according to claim 1, wherein said signal processing block comprises an A/D conversion circuit for converting an analog signal into a digital signal.

8. A sensor according to claim 7, wherein said signal processing block comprises a signal processing circuit for forming a luminance signal and a chrominance signal.

* * * * *

UNITED STATES PATENT AND TRADEMARK OFFICE
CERTIFICATE OF CORRECTION

| | | |
|---|---|---|
| PATENT NO. | : 7,129,985 B1 | Page 1 of 1 |
| APPLICATION NO. | : 09/444675 | |
| DATED | : October 31, 2006 | |
| INVENTOR(S) | : Toru Koizumi et al. | |

It is certified that error appears in the above-identified patent and that said Letters Patent is hereby corrected as shown below:

ON TITLE PAGE AT (56) U.S. PATENT DOCUMENTS

Insert: --6,686,958   2/2004    Watanabe et al. .................. 348/231.1--.

COLUMN 5

Line 42, "Embodiment." should read --embodiment.--.

COLUMN 12

Line 44, "in" should be deleted.

COLUMN 15

Line 23, "in" should be deleted.

COLUMN 16

Line 7, "identities (1)" should read --identifies (1) an--;
    Line 15, "(2)" should read --(2) an--;
    Line 16, "control" should read --controls--; and
    Line 17, "operates" should read --operate--.

Signed and Sealed this

Thirtieth Day of October, 2007

JON W. DUDAS
*Director of the United States Patent and Trademark Office*